United States Patent
Shimizu et al.

(10) Patent No.: US 11,052,563 B2
(45) Date of Patent: Jul. 6, 2021

(54) GLASS PANEL UNIT MANUFACTURING METHOD, AND GLASS WINDOW MANUFACTURING METHOD

(71) Applicant: PANASONIC INTELLECTUAL PROPERTY MANAGEMENT CO., LTD., Osaka (JP)

(72) Inventors: Takeshi Shimizu, Osaka (JP); Hiroyuki Abe, Osaka (JP); Masataka Nonaka, Osaka (JP); Kazuya Hasegawa, Osaka (JP); Eiichi Uriu, Osaka (JP); Haruhiko Ishikawa, Osaka (JP); Tasuku Ishibashi, Ishikawa (JP); Hiroshi Takahashi, Osaka (JP); Shinobu Watanabe, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/985,383

(22) Filed: Aug. 5, 2020

(65) Prior Publication Data
US 2020/0361110 A1 Nov. 19, 2020

Related U.S. Application Data

(62) Division of application No. 16/349,120, filed as application No. PCT/JP2017/040638 on Nov. 10, 2017, now Pat. No. 10,766,160.

(30) Foreign Application Priority Data

Nov. 11, 2016 (JP) .............................. JP2016-220692

(51) Int. Cl.
*B26F 1/14* (2006.01)
*E06B 3/663* (2006.01)
(Continued)

(52) U.S. Cl.
CPC .................. *B26F 1/14* (2013.01); *B26F 1/44* (2013.01); *C03C 27/06* (2013.01);
(Continued)

(58) Field of Classification Search
CPC ....................................................... B26F 1/14
(Continued)

(56) References Cited

U.S. PATENT DOCUMENTS 5,005,557 A 4/1991 Bachli
5,009,218 A 4/1991 Bachli
(Continued)

FOREIGN PATENT DOCUMENTS

CA 2844097 A1 2/2013
JP S63-501728 A 7/1988
(Continued)

OTHER PUBLICATIONS

International Search Report and Written Opinion issued in International Patent Application No. PCT/JP2017/040638, dated Jan. 30, 2018; with partial English translation.
(Continued)

*Primary Examiner* — Brent T O'Hern
(74) *Attorney, Agent, or Firm* — McDermott Will and Emery LLP

(57) ABSTRACT

A glass panel unit manufacturing method includes a punching step and a pillar mounting step. In the punching step, a punch punches at least one of a plurality of portions from a base material of a sheet to form at least one pillar. Each of the plurality of portions is surrounded by a corresponding one of a plurality of loop-shaped grooves in the base material. In the pillar mounting step, the at least one pillar is mounted on a surface of a first substrate including a glass pane.

10 Claims, 17 Drawing Sheets

(51) Int. Cl.
*E06B 3/677* (2006.01)
*C03C 27/06* (2006.01)
*E06B 3/673* (2006.01)
*B26F 1/44* (2006.01)

(52) U.S. Cl.
CPC ...... *E06B 3/66304* (2013.01); *E06B 3/66319* (2013.01); *E06B 3/66342* (2013.01); *E06B 3/677* (2013.01); *E06B 3/67304* (2013.01); *E06B 3/67326* (2013.01); *B26F 2210/02* (2013.01); *E06B 3/6775* (2013.01)

(58) Field of Classification Search
USPC .......................................... 428/34
See application file for complete search history.

(56) References Cited

U.S. PATENT DOCUMENTS

| | | | |
|---|---|---|---|
| 6,105,336 | A | 8/2000 | Katoh et al. |
| 6,210,763 | B1 | 4/2001 | Katoh et al. |
| 2012/0009097 | A1* | 1/2012 | Yamamoto ......... B81C 1/00206 422/500 |
| 2017/0268285 | A1 | 9/2017 | Abe et al. |
| 2018/0044235 | A1 | 2/2018 | Nonaka et al. |
| 2018/0051506 | A1 | 2/2018 | Abe et al. |
| 2020/0024892 | A1 | 1/2020 | Abe et al. |

FOREIGN PATENT DOCUMENTS

| | | |
|---|---|---|
| JP | H10-087350 A | 4/1998 |
| JP | H11-079799 A | 3/1999 |
| JP | 2004-323317 A | 11/2004 |
| WO | 2013/019838 A1 | 2/2013 |
| WO | 2016/084382 A1 | 6/2016 |
| WO | 2016/147604 A1 | 9/2016 |
| WO | 2016/152052 A1 | 9/2016 |

OTHER PUBLICATIONS

Search Report dated Sep. 30, 2019 issued for the corresponding European Patent Application No. 17868690.3.
Non-Final Office Action issued in U.S. Appl. No. 16/349,120, dated Jan. 23, 2020.
Notice of Allowance issued in U.S. Appl. No. 16/349,120, dated May 5, 2020.
Japanese Office Action dated Dec. 8, 2020, issued in corresponding Japanese Patent Application No. 2018-550289; with English translation.

* cited by examiner

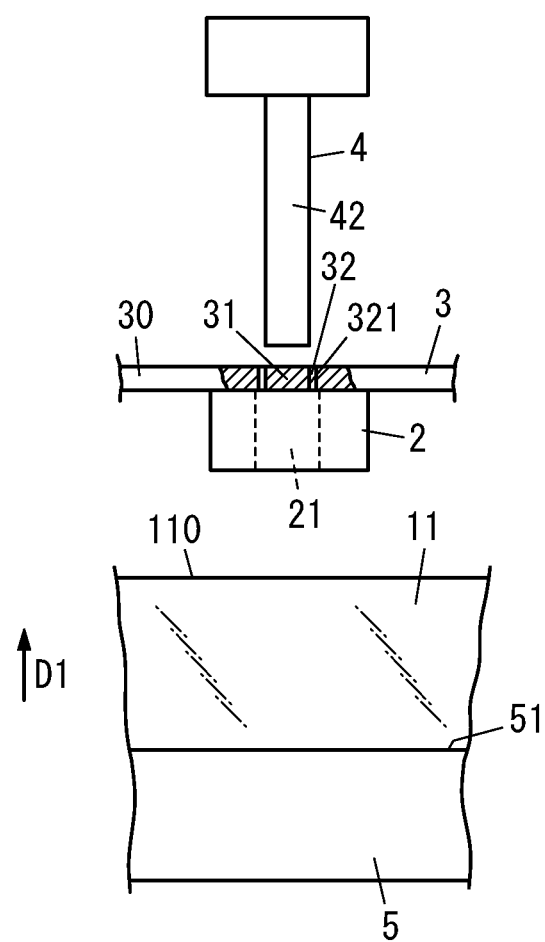

GLASS PANEL UNIT MANUFACTURING METHOD, AND GLASS WINDOW MANUFACTURING METHOD

CROSS-REFERENCE OF RELATED APPLICATIONS

This application is a Divisional application of U.S. patent application Ser. No. 16/349,120, filed on May 10, 2019, now U.S. Pat. No. 10,766,160, which is the U.S. National Phase under 35 U.S.C. § 371 of International Patent Application No. PCT/JP2017/040638, filed on Nov. 10, 2017, which in turn claims the benefit of Japanese Application No. 2016-220692, filed on Nov. 11, 2016, the entire disclosures of which Applications are incorporated by reference herein.

TECHNICAL FIELD

The present invention relates to a sheet for forming pillars for a glass panel unit, a pillar mounting device for manufacturing a glass panel unit, a glass panel unit manufacturing method, and a glass window manufacturing method.

BACKGROUND ART

Patent Literature 1 describes a glass panel unit including pillars sandwiched between a pair of substrates. Patent Literature 1 describes a manufacturing method including a step of manufacturing pillars, a step of once storing the pillars thus manufactured, and a step of mounting the pillars stored on one of the pair of substrates. Therefore, this manufacturing method includes a large number of steps and is thus inefficient.

CITATION LIST

Patent Literature

Patent Literature 1: JP H11-79799 A

SUMMARY OF INVENTION

It is an object of the present invention to efficiently manufacture a glass panel unit including pillars sandwiched between a pair of substrates.

A sheet of one aspect of the present invention is a sheet for forming pillars for a glass panel unit and includes a base material having a sheet-like shape. The base material has a plurality of loop-shaped grooves. The base material has a plurality of portions serving as the pillars. Each of the plurality of portions is surrounded by a corresponding one of the plurality of loop-shaped grooves. Each of the plurality of loop-shaped grooves is a groove having a continuous or discontinuous loop shape.

A pillar mounting device of another aspect of the present invention is a pillar mounting device for manufacturing of a glass panel unit and includes the sheet, a punch configured to punch at least one of the plurality of portions from the base material of the sheet to form at least one pillar, and a movement mechanism configured to move the at least one pillar to a surface of a substrate including a glass pane.

A manufacturing method of still another aspect of the present invention is a manufacturing method for a glass panel unit and includes a punching step, a pillar mounting step, and a bonding step. In the punching step, a punch and a sheet including a base material having a plurality of loop-shaped grooves are prepared, and at least one of a plurality of portions of the base material is punched from the base material by the punch to form at least one pillar. Each of the plurality of portions is surrounded by a corresponding one of the plurality of loop-shaped grooves. In the pillar mounting step, the at least one pillar is mounted on a surface of a first substrate including a glass pane. In the bonding step, the first substrate and a second substrate including a glass pane are bonded together with a sealing member to form an inside space between the first substrate and the second substrate so that the at least one pillar is located in the inside space. Each of the plurality of loop-shaped grooves is a groove having a continuous or discontinuous loop shape.

BRIEF DESCRIPTION OF DRAWINGS

FIG. 1 is a partially cutaway side view schematically illustrating a pillar mounting device of a first embodiment;

DESCRIPTION OF EMBODIMENTS

First Embodiment

Figure 3:
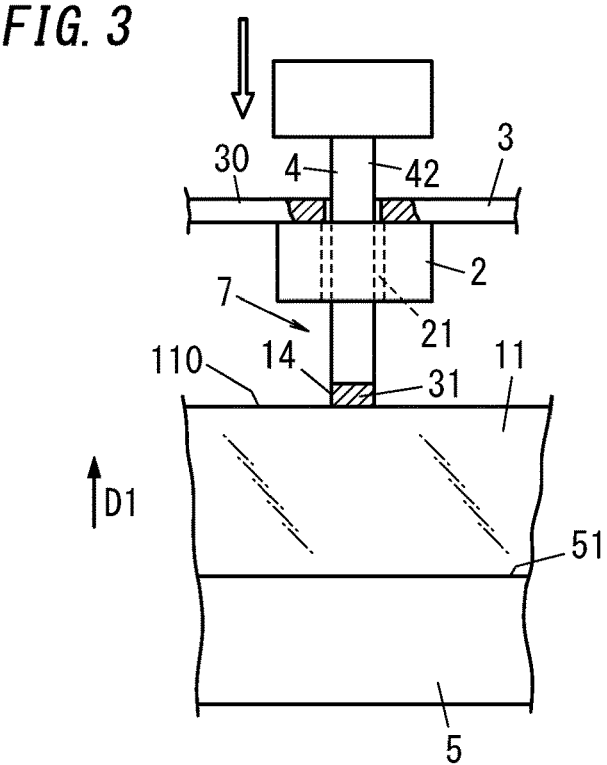
FIG. 3 is a partially cutaway side view schematically illustrating how the pillar mounting device punches the sheet.
Figure 4:
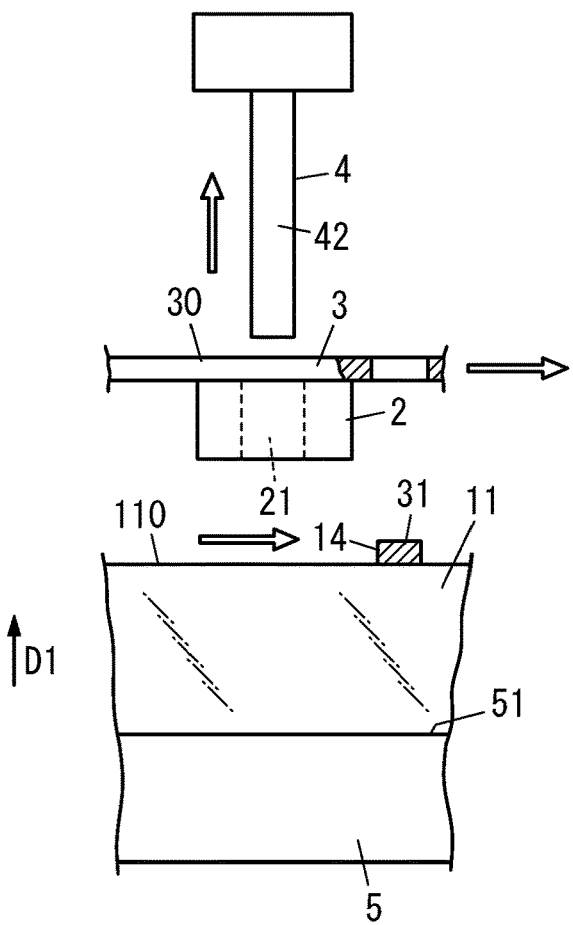
FIG. 4 is a partially cutaway side view schematically illustrating how members in the pillar mounting device are displaced.

FIGS. 1, 3, and 4 each schematically illustrate a pillar mounting device of a first embodiment. The pillar mounting device of the present embodiment is a device configured to mount pillars 14 on one surface 110 of a substrate 11 to manufacture a pillar mounting substrate 100 (see FIG. 5).

The pillar mounting substrate 100 forms a part of a glass panel unit 1 and has a structure including a plurality of pillars 14 mounted on the surface 110 of the substrate 11.

Another substrate 12 is placed on the pillar mounting substrate 100 to face the surface 110 of the substrate 11, and peripheral edges of the substrates 11 and 12 facing each other are bonded with a sealing member 13 having a frame shape, thereby obtaining the glass panel unit 1 (see FIG. 6) having an inside space 15.

The substrates 11 and 12 are both glass panes which are transparent but which may be semi-transparent or non-transparent. Moreover, the substrates 11 and 12 each include at least a glass pane and preferably include a coating such as a thermal ray reflecting film in addition to the glass pane.

In the following description, the substrate 11 and the substrate 12 are respectively referred to as a "first substrate 11" and a "second substrate 12" to be distinguished from each other.

As illustrated in FIGS. 1, 3, and 4, the pillar mounting device includes a substrate supporting part 5, a support table 2 installed above the substrate supporting part 5, a sheet 3 supported in a horizontal position by the support table 2, and a punch 4 installed above the sheet 3. In the figure, an arrow D1 indicates the up direction, and a direction opposite to the direction indicated by the arrow D1 is the down direction.

The substrate supporting part 5 has a support surface 51 which supports the first substrate 11. The substrate supporting part 5 supports the first substrate 11 in a position in which the surface 110 faces upward. As long as the substrate supporting part 5 has a structure that enables the first substrate 11 to be supported in the above-described position, the substrate supporting part 5 may have any appropriate structure.

The support table 2 is provided to be located above the surface 110 of the first substrate 11 supported by the substrate supporting part 5.

The support table 2 has a through hole 21 penetrating therethrough in the up-down direction. The support table 2 has an upper surface on which the sheet 3 is put to cover the through hole 21.

The sheet 3 includes a base material 30 in sheet form (film form). The base material 30 has a plurality of (a large number of) loop-shaped grooves 32. The plurality of loop-shaped grooves 32 are disposed with a distance to one another in a matrix form (see FIG. 2A).

The base material 30 is preferably made of a resin, but other materials such as metal, glass, ceramic, or wood may be adopted as long as they are materials that can be punched with the punch 4. As the base material 30, a base material including a plurality of stacked resin layers may be adopted.

When the base material 30 is made of a resin, it is possible to form pillars 14 each having a low thermal conductivity. Moreover, when the resin of which the base material 30 is made is polyimide, excellent heat resistance is provided.

Figure 2A:
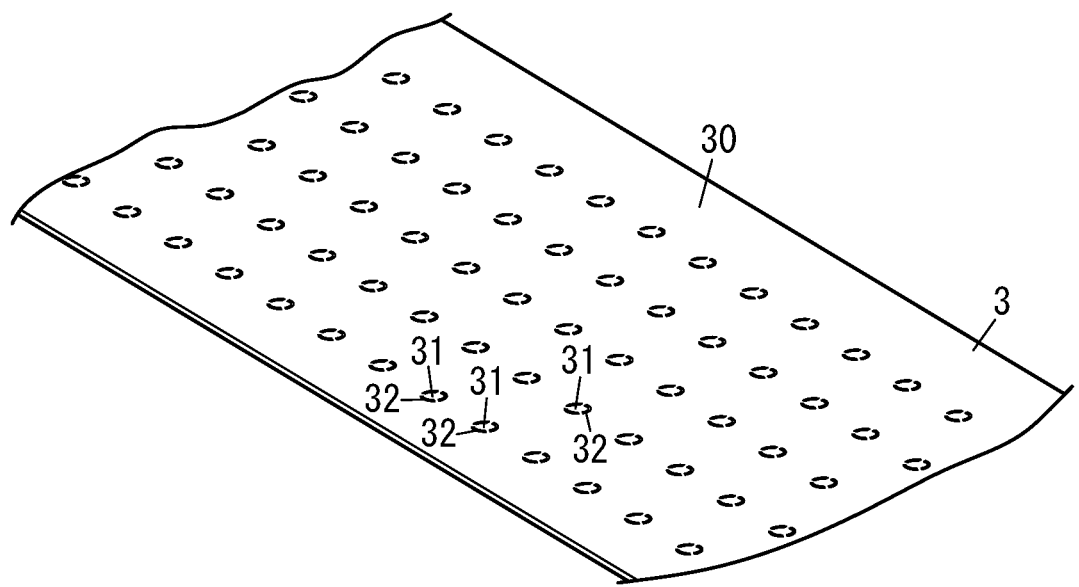
FIG. 2A is a perspective view illustrating a sheet which the pillar mounting device has.
Figure 2B:
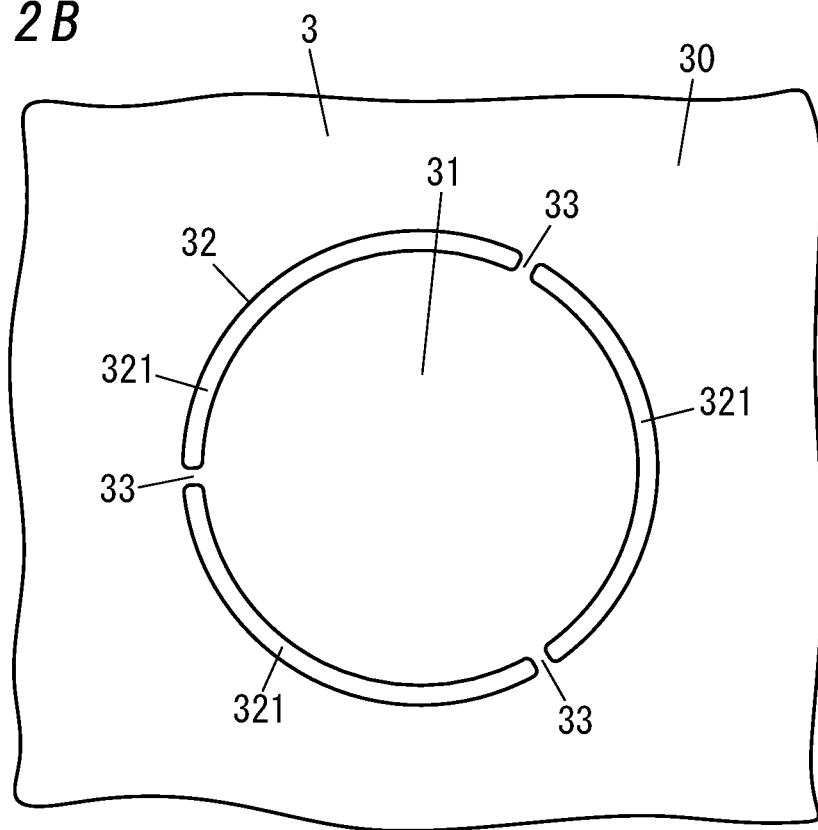
FIG. 2B is a plan view illustrating a main part of the sheet.

As illustrated in FIGS. 2A and 2B, the plurality of (a large number of) loop-shaped grooves 32 are formed in the base material 30 of the sheet 3 in advance to surround respective portions 31 each having a round shape in plan view. Each of the loop-shaped grooves 32 includes so-called perforations discontinuously formed by laser processing with, for example, a laser machine. That is, each of the loop-shaped grooves 32 includes a plurality of (three) grooves 321 each having an arc shape. Each of the loop-shaped grooves 32 is located to surround a corresponding one of the portions 31. Each of the portions 31 has a round shape in plan view. These grooves 321 each having an arc shape penetrate through the base material 30 in a thickness direction (the up-down direction) thereof. Between adjacent two of the grooves 321 each having an arc shape, a connection portion 33 is formed. A means for forming each groove 321 is not limited to the laser processing. It is also possible to form each groove 321 by another means such as etching process.

The connection portions 33 in the sheet 3 of the present embodiment are formed at a plurality of locations (three locations) at equal intervals in the circumferential direction along the outer shape of each portion 31. The connection portions 33 are portions connecting the portion 31 of the base material 30 surrounded by the loop-shaped groove 32 to the remaining portion of the base material 30.

As illustrated in FIG. 1, the punch 4 includes a pin 42 protruding downward. The pin 42 has a columnar (cylindrical) shape. The pin 42 is configured such that a tip surface (lower surface) of the pin 42 downward punches the portion 31 from the base material 30 of the sheet 3. The portion 31 is surrounded by the loop-shaped groove 32. The sheet 3 is supported by the support table 2. The through hole 21 in the support table 2 is located below the tip surface of the pin 42 with the sheet 3 placed between the tip surface and the support table 2. The pin 42 has such a dimensional shape that allows the pin to penetrate through the through hole 21.

Next, a description is given of a manufacturing method of the pillar mounting substrate 100 by using the pillar mounting device of the present embodiment and further for manufacturing the glass panel unit 1 including the pillar mounting substrate 100.

Figure 7:
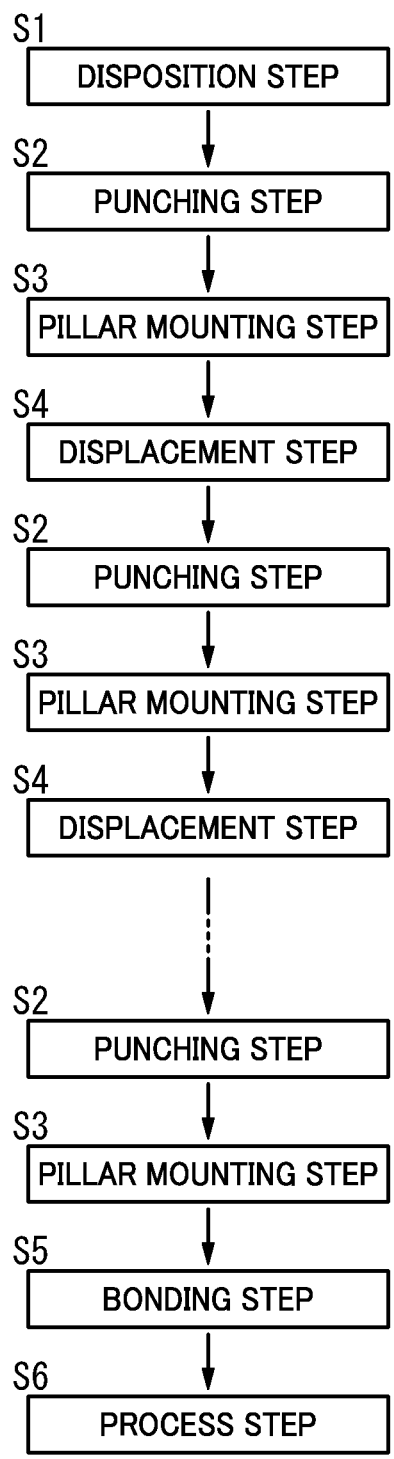
FIG. 7 is a flow diagram illustrating steps for manufacturing the glass panel unit.

As illustrated in FIG. 7, the manufacturing method according to the present embodiment includes a disposition step S1, a punching step S2, a pillar mounting step S3, a displacement step S4, a bonding step S5, and a process step S6. In the manufacturing method according to the present embodiment, the punching step S2 and the pillar mounting step S3 following the punching step S2 are repeated a plurality of times with the displacement step S4 performed between sets each including the punching step S2 and the pillar mounting step S3 which are repeated. Then, the bonding step S5 and the process step S6 are performed.

Each of the steps will be described below.

Disposition Step

In the disposition step S1, the substrate supporting part 5, the support table 2, the sheet 3, and the punch 4 are disposed (see FIG. 1) such that the substrate supporting part 5 supports the first substrate 11, the support table 2 is located above the first substrate 11, the support table 2 supports the sheet 3, and the punch 4 is located above the sheet 3. The sheet 3 is disposed to cover the upper surface of the support table 2. The pin 42 included in the punch 4 is located directly above the through hole 21 in the support table 2 with the sheet 3 placed between the pin 42 and the support table 2.

Punching Step

In the punching step S2, the punch 4 including the pin 42 is driven downward. The punch 4 is driven downward, and thereby, the pin 42 having a columnar shape downward punches the portion 31 surrounded by the loop-shaped groove 32 from the base material 30 of the sheet 3 through the through hole 21 in the support table 2 (see the void arrow in FIG. 3).

At this time, the connection portion 33 (see FIG. 2B) of the sheet 3 are broken by external force exerted by the pin 42. As a result, the portion 31 surrounded by the loop-shaped groove 32 is punched to have a columnar shape with reduced formation of burrs.

In particular, when the base material 30 of the sheet 3 is made of a resin, burrs are likely to be formed due to punching, but the pillar mounting device of the present embodiment effectively reduces the burrs. Similarly, when the base material 30 includes a plurality of resin layers, burrs are likely to be formed due to punching, but the pillar mounting device of the present embodiment effectively reduces the formation of burrs.

Pillar Mounting Step

In the pillar mounting step S3, the portion 31 which has been punched out downward by the pin 42 and which has a columnar shape is placed on the surface 110 of the first substrate 11 with the portion 31 being pressed onto the tip surface of the pin 42. The portion 31 having a columnar shape and being placed on the surface 110 forms the pillar 14.

That is, in the manufacturing method of the present embodiment, the pin 42 functions as a movement mechanism 7 (see FIG. 3). The pin 42 is configured to punch part of the base material 30 to form the pillar 14 in the punching step S2. The movement mechanism 7 is configured to move the pillar 14 immediately after being formed to the surface 110 of the first substrate 11.

Liquid such as water is preferably applied to a location on the surface 110 of the first substrate 11 where the pillar 14 is to be placed. The presence of the liquid reduces dislocation of the pillar 14 on the surface 110.

Displacement Step

In the displacement step S4, the pin 42 is displaced upward as indicated by the void arrow in FIG. 4, and then, the first substrate 11 and the sheet 3 are displaced in the horizontal direction relative to the support table 2 and the punch 4 respectively. In the present embodiment, the travel direction of the first substrate 11 may be the same as or different from the travel direction of the sheet 3.

FIG. 4 shows a case where the first substrate 11 and the sheet 3 are displaced, but the pillar mounting device may be configured such that the punch 4 and the support table 2 are displaced, or the pillar mounting device may be configured such that the first substrate 11 and the sheet 3 are displaced and the punch 4 and the support table 2 are displaced. Alternatively, the pillar mounting device may be configured such that the support table 2, the sheet 3, and the punch 4 are displaced relative to the first substrate 11 and the sheet 3 is displaced relative to the support table 2 and the punch 4.

As illustrated in FIG. 7, after the punching step S2, the pillar mounting step S3, and the displacement step S4 are performed in this order, a next punching step S2 and a next pillar mounting step S3 are performed.

In the next punching step S2, of a large number of portions 31 included in the sheet 3, a portion 31 which has not been punched and remains is punched with the pin 42. The portion 31 thus punched forms another pillar 14. In the next pillar mounting step S3, the pillar 14 is mounted on the surface 110 of the first substrate 11 by the pin 42.

In the manufacturing method according to the present embodiment, the punching step S2 and the pillar mounting step S3 following the punching step S2 are repeated a plurality of times with the displacement step S4 performed between sets each including the punching step S2 and the pillar mounting step S3 which are repeated. While the relative position between the punch 4 and the first substrate 11 is changed, the punching step S2 and the pillar mounting step S3 are performed a plurality of times, and thereby, the plurality of pillars 14 are mounted with a distance to each other on the surface 110 of the first substrate 11.

Thus, the pillar mounting substrate 100 (see FIG. 5) including a plurality of pillars 14 is efficiently manufactured.

When a large number of pillars are manufactured in advance and are stored as described in the prior art technique, the pillars may be adsorbed on each other due to static electricity or the like. In contrast, according to the manufacturing method of the present embodiment, it is possible to reduce pillars 14 adsorbed on each other. Thus, as a material for the pillars 14 (that is, as a material for the sheet 3), it is possible to adopt a material such as a resin which is likely to generate static electricity, and thus, the degree of freedom of selection of the material for the pillars 14 increases.

Moreover, the manufacturing method of the present embodiment reduces formation of burrs formed at the portion 31 punched from the base material 30. This increases the strength (compressive strength) of the pillar 14 formed of the portion 31.

Bonding Step

Figure 5:
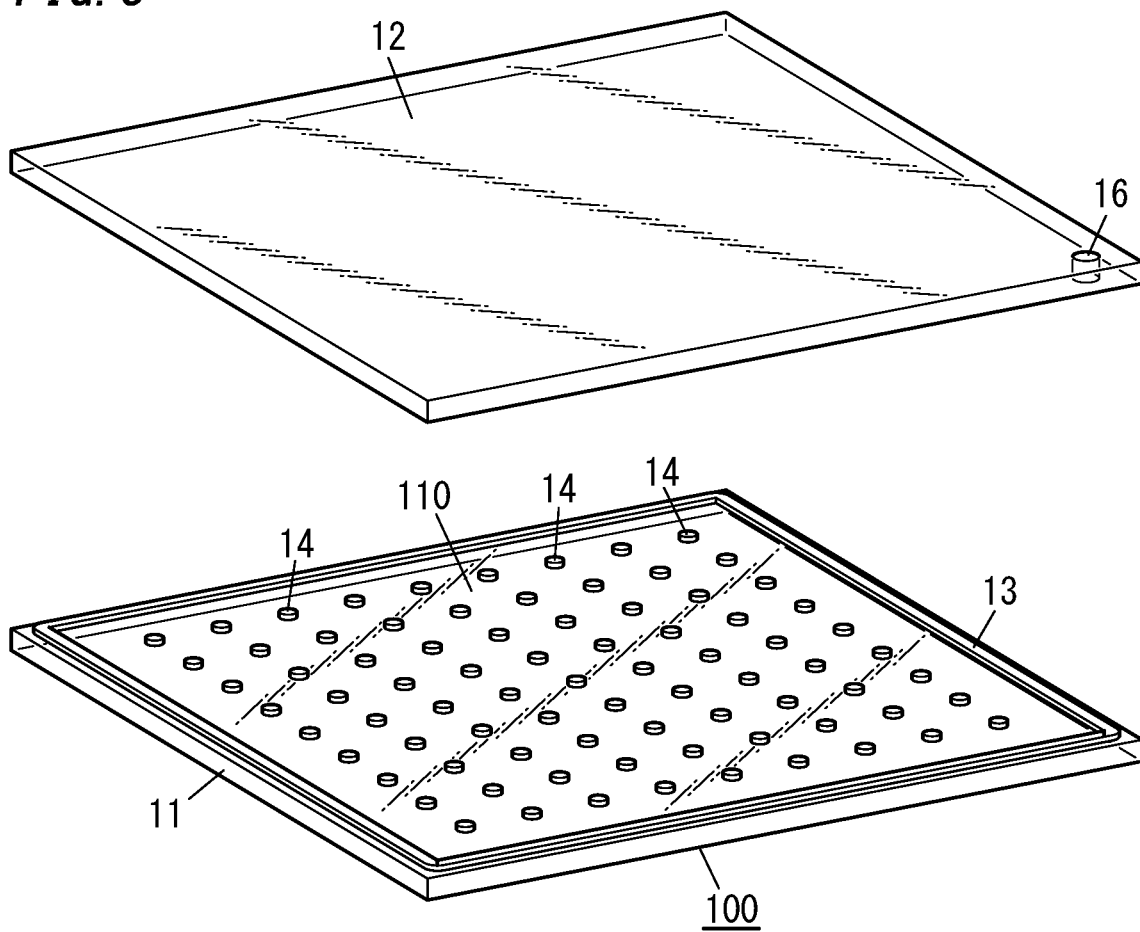
FIG. 5 is a perspective view schematically illustrating a pillar mounting substrate manufactured by the pillar mounting device and a substrate to be bonded to the pillar mounting substrate.

As illustrated in FIG. 5, in the bonding step S5, the sealing member 13 having a frame shape is disposed on a peripheral portion of the surface 110 of the first substrate 11. The sealing member 13 is located on the surface 110 of the first substrate 11 to surround the plurality of pillars 14.

Moreover, in the bonding step S5, the second substrate 12 is placed to sandwich the plurality of pillars 14 and the sealing member 13 between the second substrate 12 and the first substrate 11, and the first substrate 11 and the second substrate 12 are bonded together with the sealing member 13.

Figure 6:
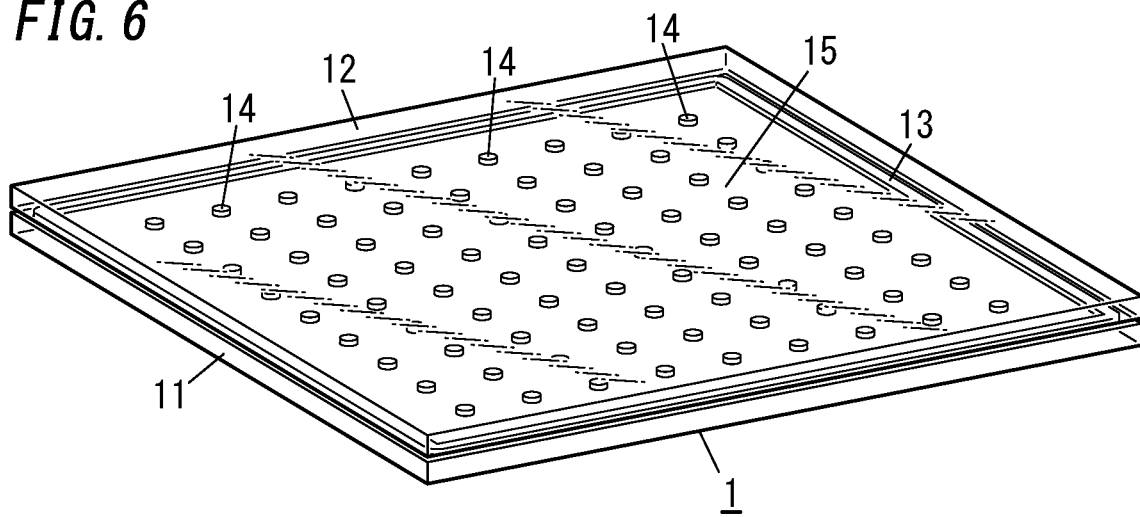
FIG. 6 is a perspective view schematically illustrating a glass panel unit including the pillar mounting substrate manufactured by the pillar mounting device.

The inside space 15 is formed between the first substrate 11 the second substrate 12 thus bonded (see FIG. 6). In the inside space 15, the plurality of pillars 14 are located. Each pillar 14 is in contact with the first substrate 11 and the second substrate 12 and maintains the distance between the first substrate 11 and the second substrate 12.

Process Step

In the process step S6, through a ventilation hole 16 (see FIG. 5) in the second substrate 12, a pressure in the inside space 15 is reduced to a prescribed degree of vacuum (e.g., degree of vacuum lower than or equal to 0.1 Pa), or gas (dry air, argon, or the like) having thermal insulation properties is supplied to the inside space 15, and then, the ventilation hole 16 is sealed.

The process step S6 forms the glass panel unit 1 as illustrated in FIG. 6. In the glass panel unit 1 shown in FIG. 6, a sealing site of the ventilation hole 16 is omitted.

The glass panel unit 1 has the inside space 15 between the first substrate 11 and the second substrate 12. The inside space 15 is hermetically sealed with a reduced pressure therein or with gas supplied therein. The glass panel unit 1 has the inside space 15 and thus has a high thermal insulation property.

There may be a case where the pressure in the inside space 15 is not reduced and gas is not supplied to the inside space 15. That is, a glass panel unit 1 may be formed by a manufacturing method without the process step S6. The glass panel unit 1 formed by this manufacturing method of the case also has thermal insulation properties to some extent.

Moreover, in the present embodiment, a large number of pillars 14 are disposed with the substantially same distance to one another in a matrix form between the first substrate 11 and the second substrate 12. However, the number and locations of the pillars 14 are not particularly limited. One pillar 14 may be disposed on the surface 110 of the first substrate 11.

Figure 8A:
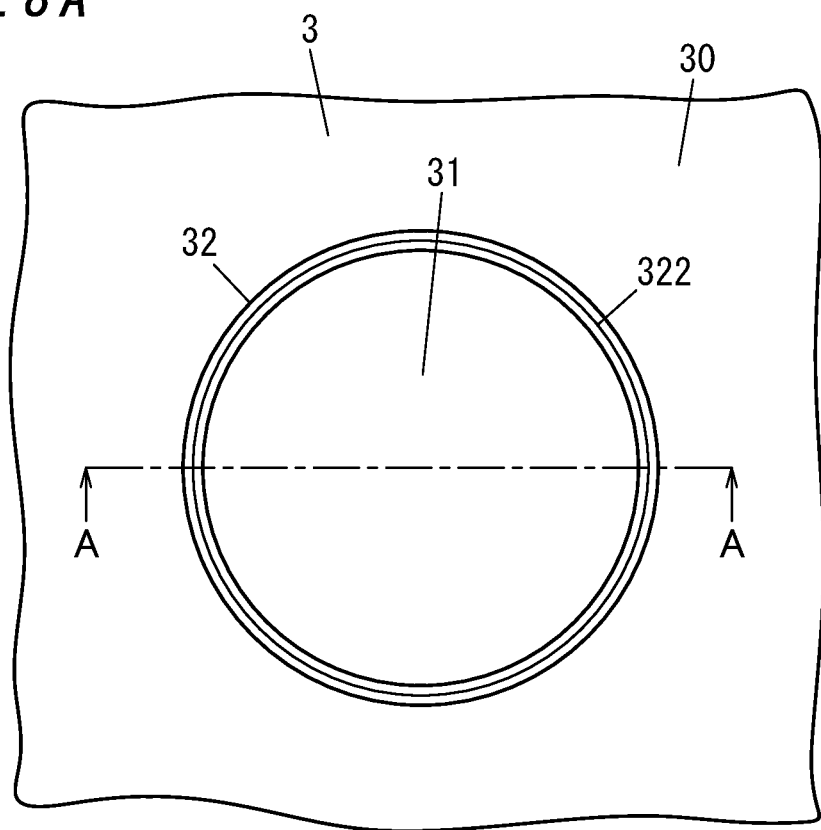
FIG. 8A is a plan view illustrating a main part of a variation of the sheet included in the pillar mounting device.
Figure 8B:
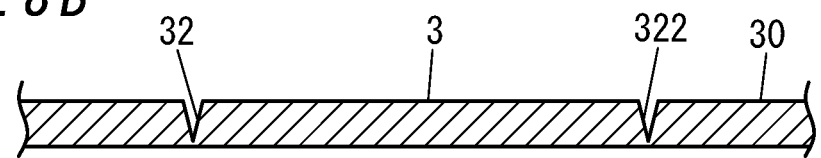
FIG. 8B is a cross-sectional view taken along line A-A of FIG. 8A.

In the present embodiment, the loop-shaped groove 32 includes a plurality of grooves 321 penetrating the base material 30 of the sheet 3 in the thickness direction of the base material 30. However, as illustrated in FIGS. 8A and 8B, the loop-shaped groove 32 may include a non-through groove 322. The non-through groove 322 is formed by laser processing on one surface of, for example, the sheet 3 to have a continuous loop shape. A means for forming the loop-shaped groove 32 having such a continuous shape is not limited to the laser processing, but another means such as an etching process enables the loop-shaped groove 32 to be formed.

When the pin 42 is driven into the portion 31 surrounded by the loop-shaped groove 32 (non-through groove 322) in the base material 30, a bottom part of the loop-shaped groove 32 is broken, and the portion 31 surrounded by the loop-shaped groove 32 is punched to have a columnar shape with reduced formation of burrs.

Note that not all the loop-shaped grooves 32 have to be non-through grooves. Some of the loop-shaped grooves 32 may be formed not to penetrate through the base material 30, and the other of the loop-shaped grooves 32 may be formed to penetrate through the base material 30. Alternatively, the loop-shaped groove 32 may have a discontinuous loop shape and may be formed not to penetrate through the base material 30.

In the present embodiment, the loop-shaped groove 32 has an annular shape, but the shape of the loop-shaped groove 32 is not limited to this embodiment. The shape of the loop-shaped groove 32 may be, for example, a polygonal shape (quadrangular shape, hexagonal shape, or the like), or other shapes (ellipse shape, Reuleaux triangle-shape, star shape, or the like). In this case, the portion 31 surrounded by the loop-shaped groove 32 is punched from the base material 30, thereby forming the pillar 14 having a shape corresponding to the shape of the loop-shaped groove 32.

Moreover, in the present embodiment, the plurality of loop-shaped grooves 32 are disposed with a distance to each other in the base material 30 of the sheet 3. However, no distance may be formed between adjacent loop-shaped grooves 32. For example, when each loop-shaped groove 32 has a quadrangular shape, adjacent loop-shaped grooves 32 may share a part thereof (part on one side of the quadrangular shape). In this case, on the base material 30 of the sheet 3, a plurality of (a large number of) portions 31 each having a quadrangular shape are arranged in rows and columns, that is, in a matrix form. The plurality of (a large number of) loop-shaped grooves 32 each having a quadrangular shape and surrounding the portions 31 are combined altogether to form a grid groove structure including a plurality of longitudinal grooves and a plurality of lateral grooves transverse to one another. The portions 31 surrounded by the respective loop-shaped grooves 32 are punched from the base material 30, thereby forming quadrangular prism pillars 14.

Figure 9:
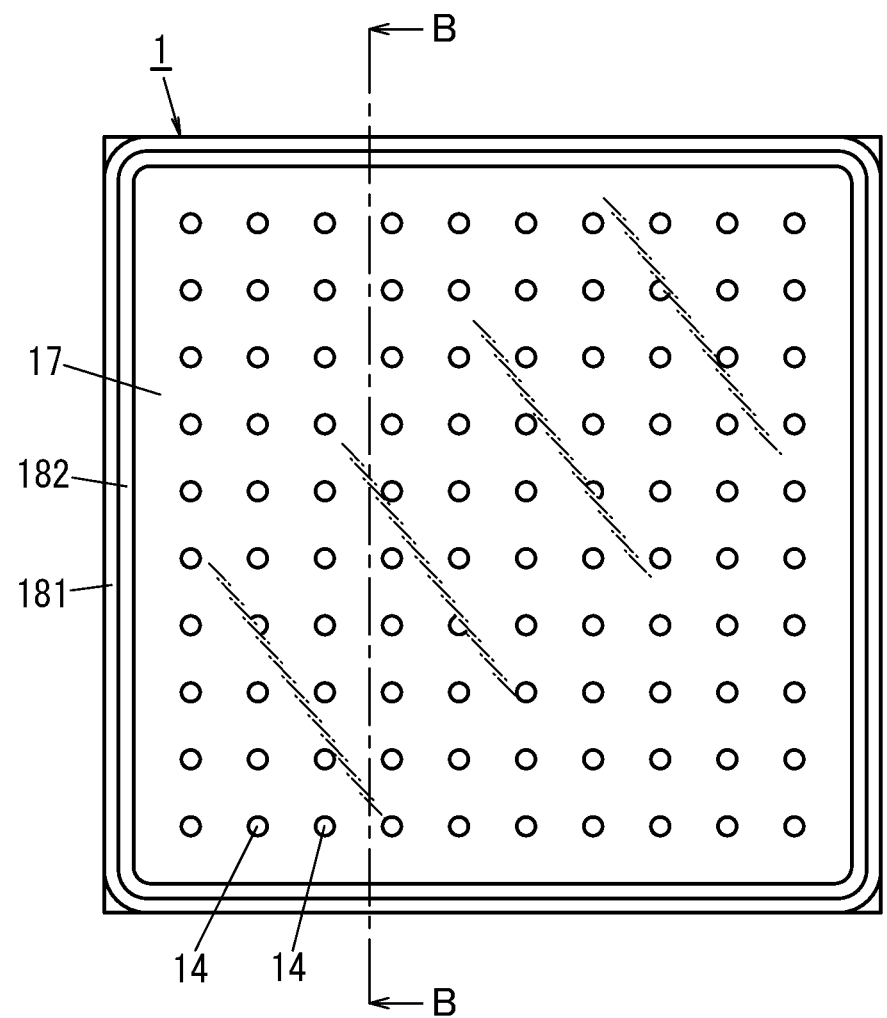
FIG. 9 is a plan view schematically illustrating a variation of the glass panel unit including the pillar mounting substrate manufactured by the pillar mounting device.
Figure 10:
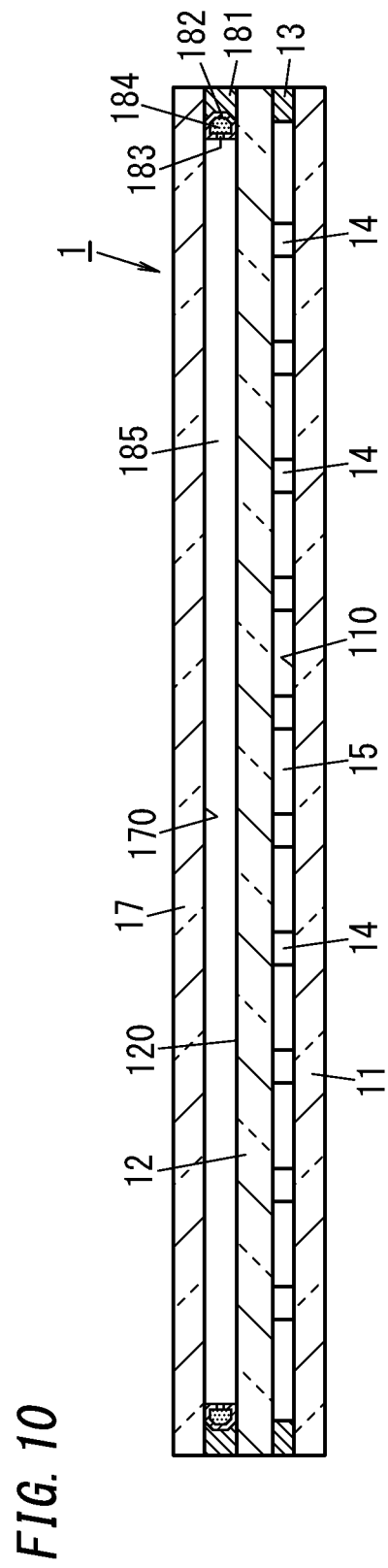
FIG. 10 is a cross-sectional view taken along line B-B of FIG. 9.
Figure 12:
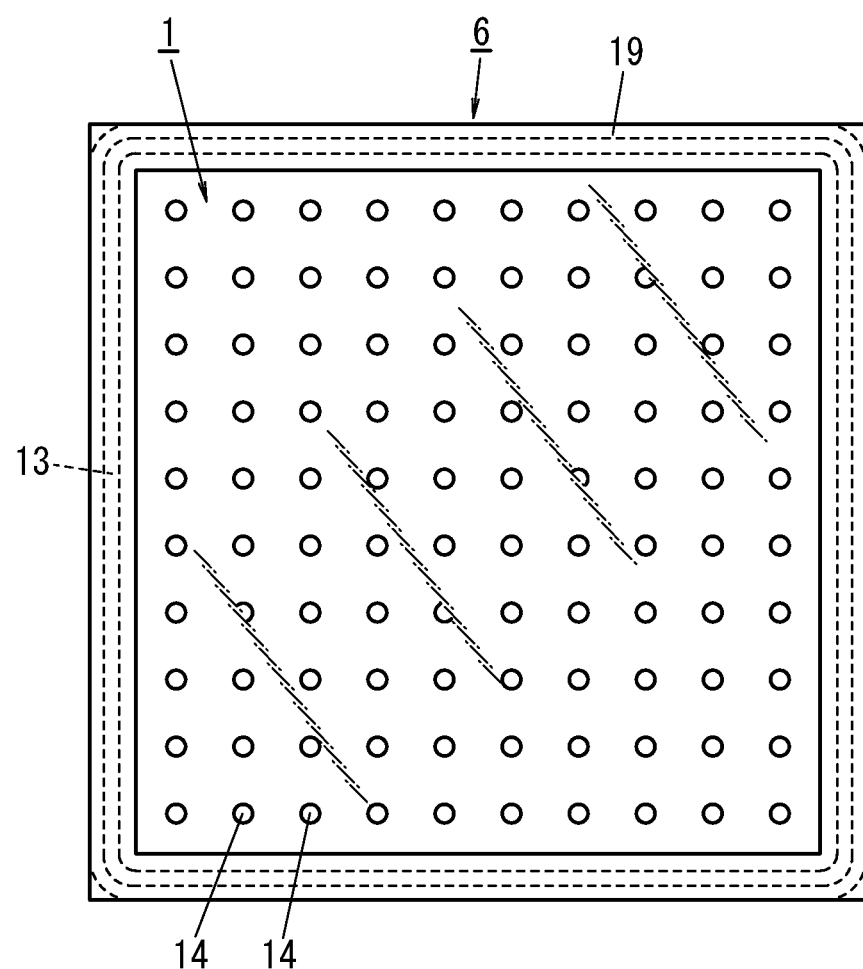
FIG. 12 is a plan view schematically illustrating a glass window including the pillar mounting substrate manufactured by the pillar mounting device.

By using the pillar mounting device of the present embodiment, it is possible to manufacture a variation of the glass panel unit 1 as illustrated in FIGS. 9 and 10 and it is possible to manufacture a glass window 6 as illustrated in FIG. 12.

The variation of the glass panel unit 1 illustrated in FIGS. 9 and 10 includes a third substrate 17 and a frame member 181 in addition to the components of the glass panel unit 1 shown in FIG. 6. The third substrate 17 is located to face the second substrate 12. The frame member 181 hermetically bonds entire peripheral portions of the second substrate 12 and the third substrate 17 together.

The third substrate 17 includes at least a glass pane similarly to the first substrate 11 and the second substrate 12 and may adopt an appropriate panel. The third substrate 17 is transparent generally but may be semi-transparent or non-transparent.

A space 185 which is sealed is formed between counter surfaces 120 and 170 respectively of the second substrate 12 and the third substrate 17.

The third substrate 17 is located to face one of the first substrate 11 and the second substrate 12. Although not shown in the figure, when the third substrate 17 is disposed to face the first substrate 11, the frame member 181 is bonded to peripheral portions of the first substrate 11 and the third substrate 17, and the space 185 is formed between the first substrate 11 and the third substrate 17.

As illustrated in FIG. 10, a spacer 182 is further disposed on an inner side of the frame member 181. The spacer 182 has a frame shape having a hollow. The hollow of the spacer 182 is filled with desiccant 184.

The spacer 182 is made of metal such as aluminum and has a through hole 183 on an inner circumferential side thereof. The hollow of the spacer 182 is in communication with the space 185 via the through hole 183. The desiccant 184 may be a silica gel, for example. The frame member 181 is preferably made of, for example, a highly airtight resin such as a silicon resin and butyl rubber.

The space 185 is a space hermetically sealed with the second substrate 12 (or the first substrate 11), the third substrate 17, and the frame member 181. The space 185 is filled with a dry gas. The dry gas is, for example, a dry rare gas such as argon gas or dry air. The dry air includes air dried after sealed in the space 185 due to the effect of the desiccant 184.

In the variation of the above-described glass panel unit 1, the inside space 15 and the space 185 are provided between the third substrate 17 and the first substrate 11 (or the second substrate 12), thereby providing a high thermal insulation property. The third substrate 17 is located on one end in a thickness direction of the glass panel unit 1, and the first substrate 11 (or the second substrate 12) is located on the other end in the thickness direction. The inside space 15 has a pressure reduced to a prescribed degree of vacuum or is supplied with gas. The space 185 is filled with a drying gas.

Figure 11:
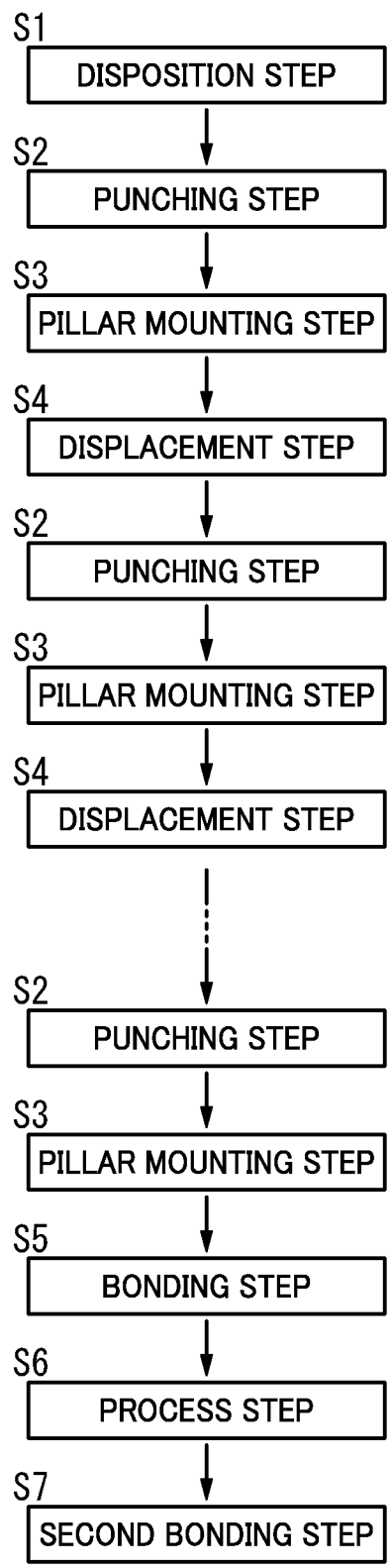
FIG. 11 is a flow diagram illustrating steps for manufacturing the variation of the glass panel unit.

As illustrated in FIG. 11, the manufacturing method of the variation of the glass panel unit 1 includes a second bonding step S7 performed after the process step S6 in addition to the steps shown in FIG. 7. The second bonding step S7 is a step of bonding the third substrate 17 to one of the first substrate 11 and the second substrate 12 with a frame member 181 disposed between the third substrate 17 and the one of the first substrate 11 and the second substrate 12.

A glass window 6 shown in FIG. 12 has a structure in which a window frame 19 is fitted to the glass panel unit 1 shown in FIG. 6, and the glass window 6 has a high thermal insulation property. In the glass window 6, the sealing member 13 of the glass panel unit 1 is preferably hidden by the window frame 19 when viewed from the front side.

Figure 13:
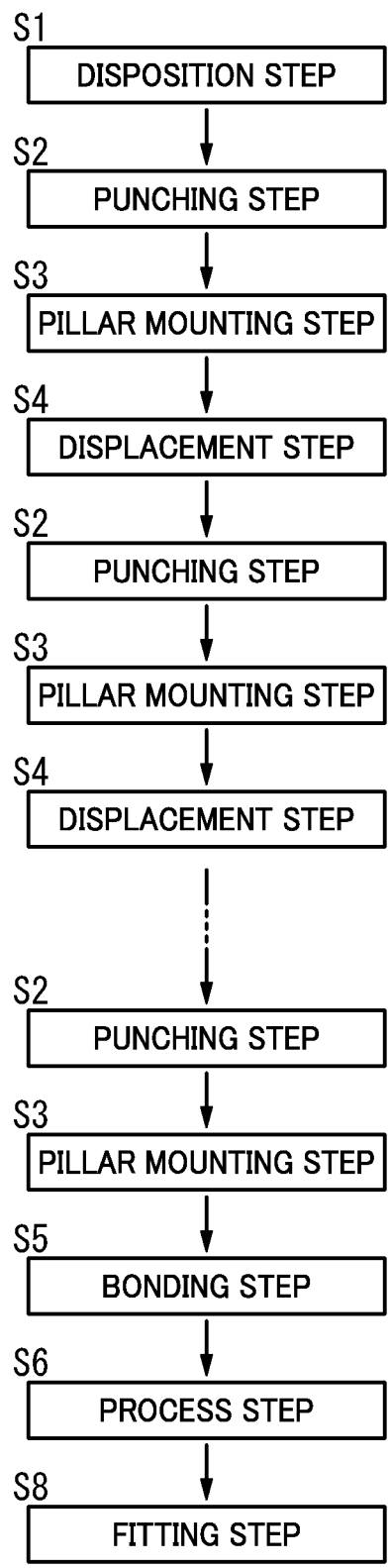
FIG. 13 is a flow diagram illustrating steps for manufacturing the glass window.

As illustrated in FIG. 13, a manufacturing method of the glass window 6 includes a fitting step S8 of fitting the window frame 19 to the glass panel unit 1 in addition to the steps shown in FIG. 7.

A target to which the window frame 19 is fitted is not limited to the glass panel unit 1 as shown in FIG. 6. The window frame 19 may be fitted to a glass panel unit 1 as illustrated in, for example, FIGS. 9 and 10. In each case, a glass window 6 having a high thermal insulation property is obtained.

Second Embodiment

A pillar mounting device of a second embodiment will be described with reference to FIGS. 14 to 16. Of components of the pillar mounting device of the present embodiment, components similar to those of the first embodiment are denoted by the same reference signs, and the detailed description thereof will be omitted. In the following description, of the components of the pillar mounting device of the present embodiment, components different from those of the first embodiment will be mainly described.

Figure 15:
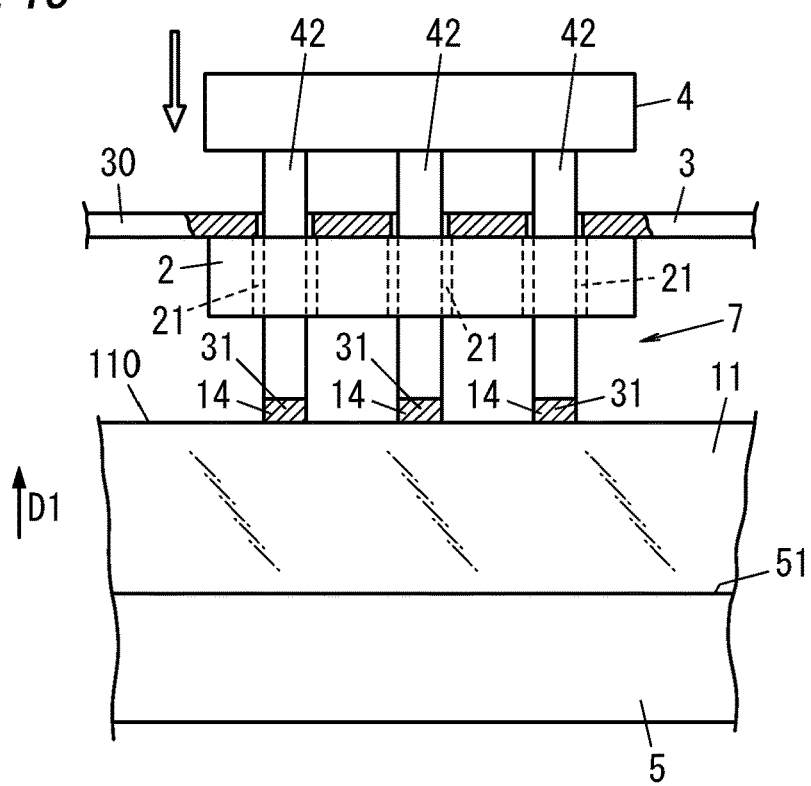
FIG. 15 is a partially cutaway side view schematically illustrating how the pillar mounting device of the second embodiment punches a sheet.

A support table 2 included in the pillar mounting device of the present embodiment has a plurality of through holes 21 (see FIG. 15). The plurality of through holes 21 have the same dimensional shape and are located with a distance to one another. The plurality of through holes 21 are located in a matrix form in plan view.

A punch 4 included in the pillar mounting device of the present embodiment includes a plurality of pins 42. The plurality of pins 42 have the same dimensional shape and are located with a distance to one another. The plurality of pins 42 are located in a matrix form in plan view.

The arrangement pattern of the plurality of pins 42 corresponds to the arrangement pattern of the plurality of through holes 21 in plan view. The plurality of pins 42 may be driven into the plurality of through holes 21 located below on a one-to-one basis. Note that the pillar mounting device of the present embodiment is configured to drive the plurality of pins 42 altogether but may be configured to drive the plurality of pins 42 individually.

Next, a manufacturing method of the glass panel unit 1 by using the pillar mounting device of the present embodiment will be described. Similarly to the manufacturing method of the first embodiment, the manufacturing method of the present embodiment includes a disposition step S1, a punching step S2, a pillar mounting step S3, a displacement step S4, a bonding step S5, and a process step S6. In the following description, detailed description of components in each step which are similar to those in the first embodiment is partially omitted.

Disposition Step

Figure 14:
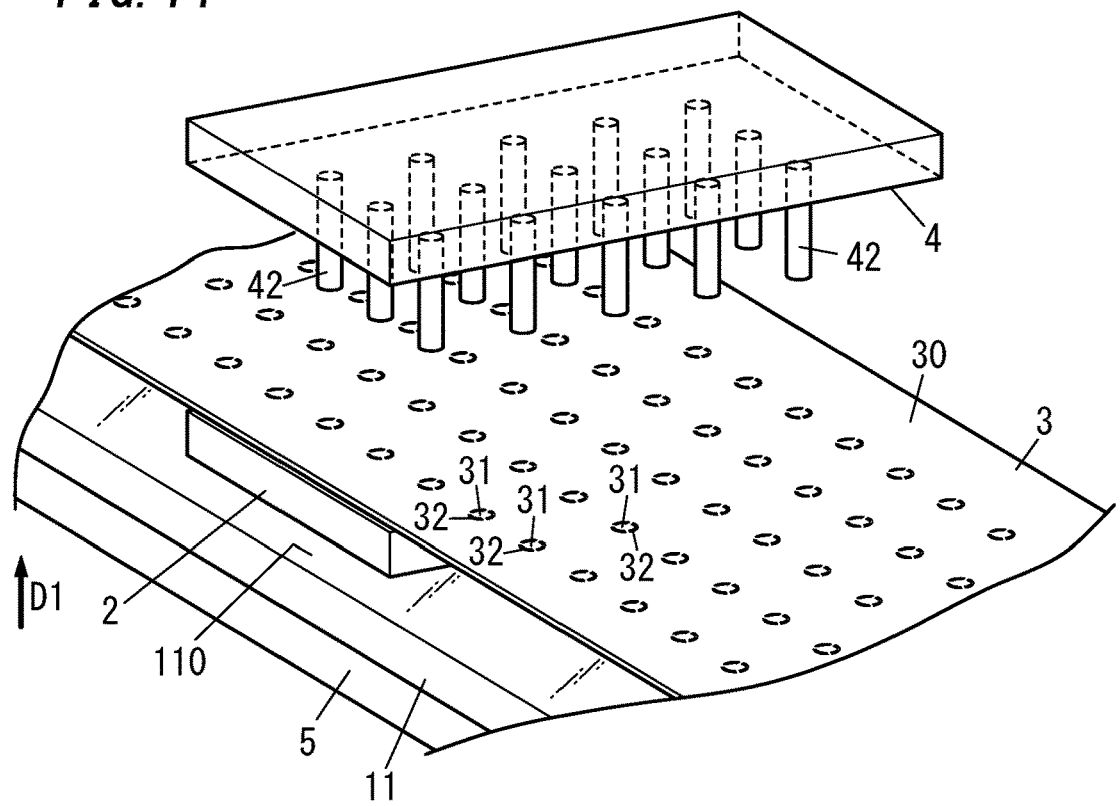
FIG. 14 is a perspective view schematically illustrating a pillar mounting device of a second embodiment.

In the disposition step S1 of the present embodiment, a substrate supporting part 5, a first substrate 11, a support table 2, a sheet 3, and a punch 4 are disposed in this order (see FIG. 14).

The sheet 3 has a base material 30 in which a plurality of (a large number of) loop-shaped grooves 32 are formed in advance in a matrix form. The plurality of pins 42 are disposed to correspond to the plurality of loop-shaped grooves 32 on a one-to-one basis.

Punching Step

In the punching step S2, the plurality of pins 42 included in the punch 4 are driven into the sheet 3 (see the void arrow in FIG. 15). Thus, through the plurality of through holes 21 in the support table 2, portions 31 surrounded by the plurality of loop-shaped grooves 32 are punched downward from the base material 30. That is, in the present embodiment, the plurality of portions 31 are punched from the base material 30 by one time of punching.

Pillar Mounting Step

In the pillar mounting step S3, the plurality of portions 31 punched from the base material 30 with the plurality of pins 42 are, immediately after being punched, mounted as is on a surface 110 of the first substrate 11 by the plurality of pins 42. The plurality of portions 31 mounted on the surface 110 form respective pillars 14.

That is, in the manufacturing method of the present embodiment, the plurality of pins 42 for forming the plurality of pillars 14 in the punching step S2 functions as a movement mechanism 7 (see FIG. 15) configured to move the plurality of pillars 14 immediately after being formed to the surface 110 of the first substrate 11.

Also in the present embodiment, liquid such as water is preferably applied to locations on the surface 110 of the first substrate 11 where the plurality of pillars 14 are to be mounted. The presence of the liquid reduces dislocation of each pillar 14 on the surface 110.

Displacement Step

Figure 16:
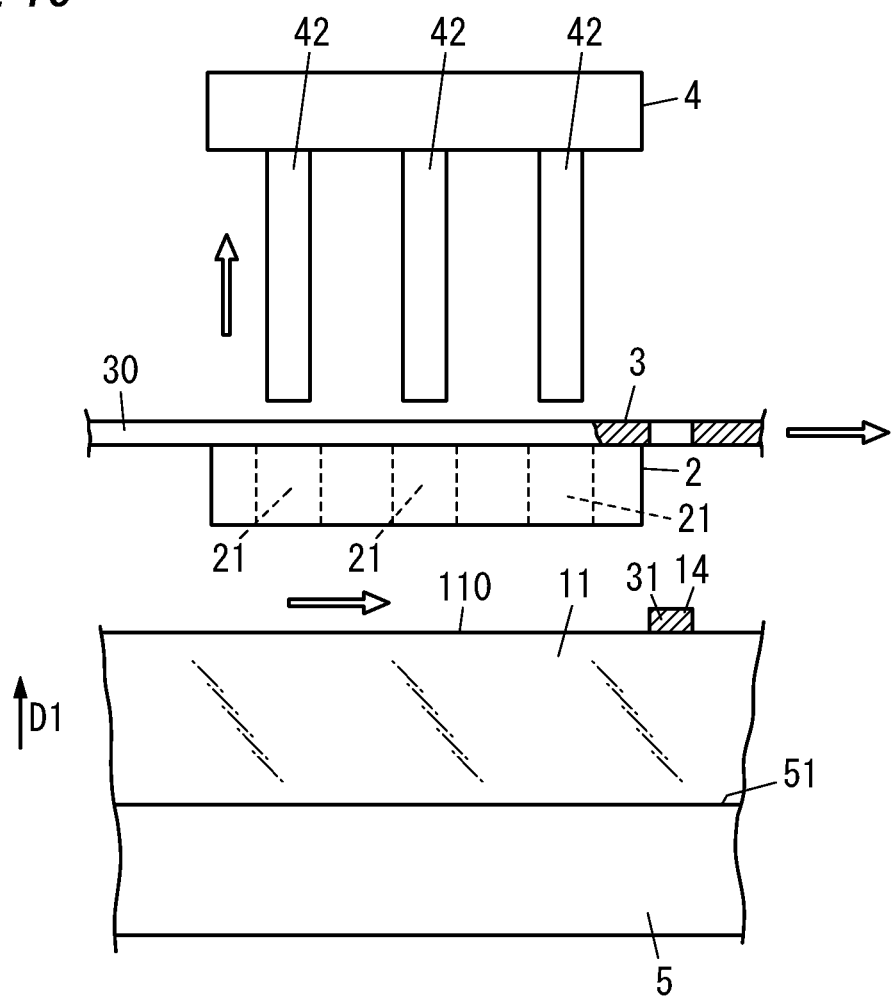
FIG. 16 is a partially cutaway side view schematically illustrating how the sheet and a substrate in the pillar mounting device of the second embodiment are displaced.

In the displacement step S4, similarly to the first embodiment, the plurality of pins 42 are displaced upward, and then, the first substrate 11 and the sheet 3 are displaced in the horizontal direction relative to the support table 2 and the punch 4 respectively (see the void arrow in FIG. 16). Also in the present embodiment, the punching step S2 and the pillar mounting step S3 following the punching step S2 are repeated a plurality of times with the displacement step S4 performed between sets each including the punching step S2 and the pillar mounting step S3 which are repeated. Thus, a pillar mounting substrate 100 including a plurality of (a large number of) pillars 14 is manufactured.

Note that when the punching step S2 is performed once, the pillar mounting substrate 100 may be manufactured. In this case, the displacement step S4 is not required.

Bonding Step, Process Step

The bonding step S5 and the process step S6 are similar to those in the first embodiment. Further performing both the steps S5 and S6 provides a glass panel unit 1 including the pillar mounting substrate 100 and having a high thermal insulation property.

Also in the manufacturing method of the present embodiment, similarly to the variation described in the first embodiment, further performing a second bonding step S7 enables a glass panel unit 1 including three layers to be manufactured. Moreover, further performing a fitting step S8 enables a glass window 6 having a high thermal insulation property to be manufactured.

Third Embodiment

Figure 17:
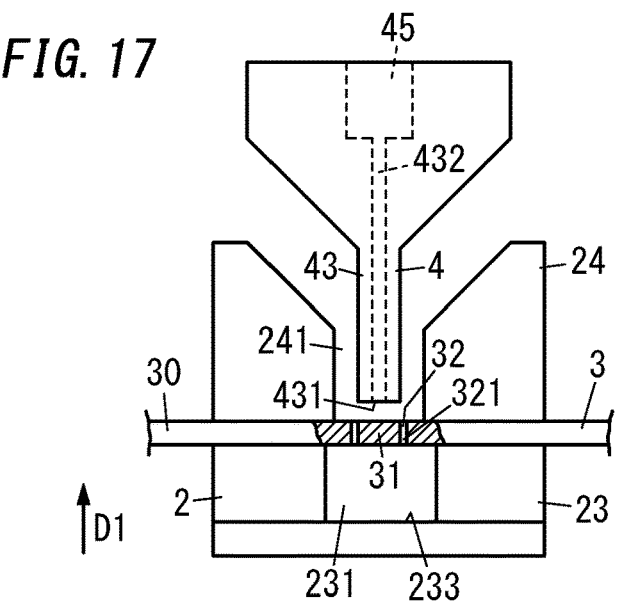
FIG. 17 is a partially cutaway side view schematically illustrating a pillar mounting device of a third embodiment.
Figure 18:
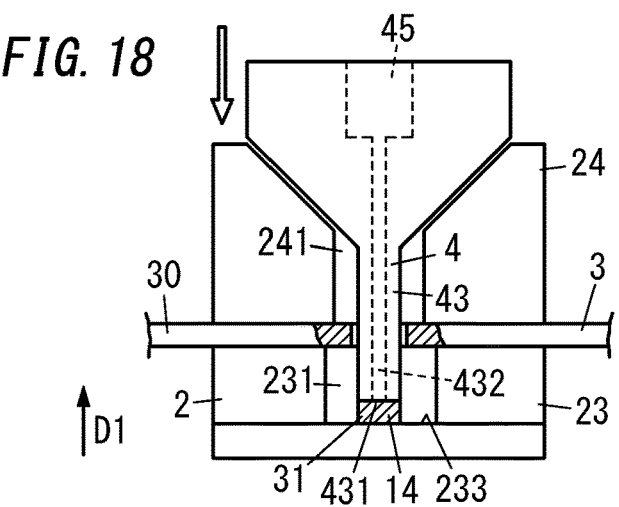
FIG. 18 is a partially cutaway side view schematically illustrating how the pillar mounting device of the third embodiment punches a sheet.
Figure 19:
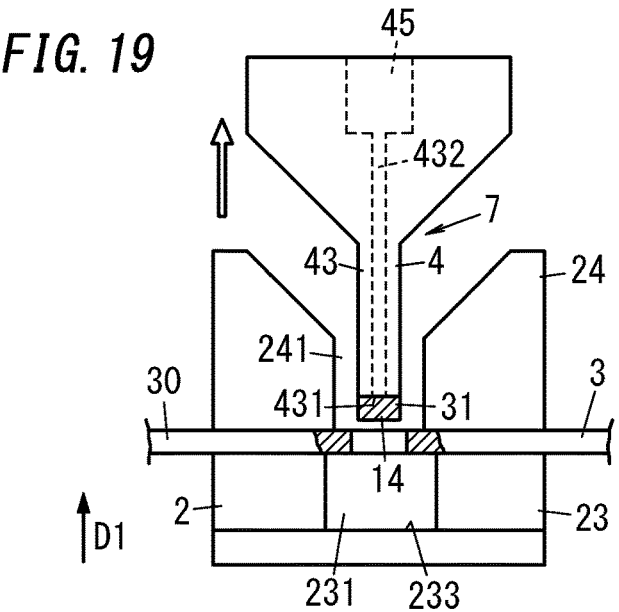
FIG. 19 is a partially cutaway side view schematically illustrating how a pillar formed by the pillar mounting device of the third embodiment is moved.

A pillar mounting device of a third embodiment will be described with reference to FIGS. 17 to 19. Of components of the pillar mounting device of the present embodiment, components similar to those of the first embodiment are denoted by the same reference signs, and the detailed description thereof will be omitted. In the following description, of the components of the pillar mounting device of the present embodiment, components different from those of the first embodiment will be mainly described.

The pillar mounting device of the present embodiment includes a support table 2, a sheet 3 held in a horizontal position by the support table 2, and a punch 4 installed above the sheet 3.

The support table 2 includes a lower member 23 and an upper member 24. The lower member 23 has a groove 231 that is recessed downward. The upper member 24 has a through hole 241 penetrating therethrough in the up-down direction. An upper end of the groove 231 has an opening, and a lower end of the groove 231 has a bottom surface 233. Between the lower member 23 and the upper member 24, a small gap is provided, and the sheet 3 is disposed in the gap.

Similarly to the first embodiment, the sheet 3 has a base material 30 in which a plurality of (a large number of) loop-shaped grooves 32 are formed in a matrix form (see FIG. 2A).

The punch 4 has a suction pin 43 which has a hollow and which protrudes downward. The suction pin 43 is configured such that a tip surface (lower surface) of the suction pin 43 downward punches a portion 31 from the base material 30 of the sheet 3. The portion 31 is surrounded by the loop-shaped groove 32. The sheet 3 is supported by the support table 2. The groove 231 in the lower member 23 is located below the tip surface of the suction pin 43 with the sheet 3 placed between the tip surface and the lower member 23.

The tip surface of the suction pin 43 has an inlet 431 formed therein. The inlet 431 is in communication with a space 45 formed in the punch 4 through a hollow section 432 of the suction pin 43. Reducing a pressure in the space 45 with, for example, a vacuum pump enables the tip surface of the suction pin 43 to be in vacuum contact with the pillar 14.

Next, a manufacturing method of a pillar mounting substrate 100 by using the pillar mounting device of the present embodiment will be described. In the following description, detailed description of components in each step which are similar to those in the first embodiment is partially omitted.

Disposition Step

In a disposition step S1, the support table 2, the sheet 3, and the punch 4 are disposed (see FIG. 17) such that the support table 2 supports the sheet 3 and the suction pin 43 is located above the sheet 3. The suction pin 43 is located directly above the groove 231 in the lower member 23 of the support table 2 with the sheet 3 placed between the suction pin 43 and the lower member 23.

Punching Step

In the punching step S2, the suction pin 43 included in the punch 4 is driven downward through the through hole 241 in the upper member 24. The suction pin 43 downward punches the portion 31 surrounded by a loop-shaped groove 32 from the base material 30 of the sheet 3 through the groove 231 of the lower member 23 downward (see the void arrow in FIG. 18).

At this time, connection portions 33 (see FIG. 2B) of the sheet 3 are broken by external force exerted by the suction pin 43. As a result, the portion 31 surrounded by the loop-shaped groove 32 is punched to have a columnar shape with reduced formation of burrs.

The portion 31 which is punched out with the suction pin 43 and which has a columnar shape is pressed against the bottom surface 233 of the groove 231 with the portion 31 being pressed against the tip surface of the suction pin 43. The portion 31 having a columnar shape and being pressed against the bottom surface 233 forms the pillar 14.

Pillar Mounting Step

In the pillar mounting step S3, the suction pin 43 is in vacuum contact with the pillar 14 pressed against the tip surface. The punch 4 is driven upward (see the void arrow in FIG. 19) with the vacuum contact of the suction pin 43 with the pillar 14 being maintained to move the pillar 14 to a prescribed location on a surface 110 of a first substrate 11 (see, for example, FIG. 5).

That is, in the manufacturing method of the present embodiment, the suction pin 43 functions as a movement mechanism 7. The suction pin 43 is configured to punch part of the base material 30 to form the pillar 14 in the punching step S2. The movement mechanism 7 is configured to move the pillar 14 to the surface 110 of the first substrate 11.

Displacement Step

Although not shown, in the displacement step S4, after the punching step S2 and the pillar mounting step S3 are performed, the sheet 3 is displaced in the horizontal direction relative to the support table 2. After the displacement step S4 is performed, a next punching step S2 and a next pillar mounting step S3 are performed.

In the next punching step S2, of a large number of portions 31 included in the sheet 3, a portion 31 which is not punched and remains is punched with the suction pin 43. The portion 31 thus punched forms another pillar 14. In the next pillar mounting step S3, the pillar 14 is mounted on the surface 110 of the first substrate 11 by the suction pin 43.

Similar to the first embodiment, in the manufacturing method of the present embodiment, the punching step S2 and the pillar mounting step S3 following the punching step S2 are repeated a plurality of times with the displacement step S4 performed between sets each including the punching step S2 and the pillar mounting step S3 which are repeated. Thus, the pillar mounting substrate 100 (see FIG. 5) including the plurality of pillars 14 is efficiently manufactured.

Steps of manufacturing a glass panel unit 1 and a glass window 6 each including the pillar mounting substrate 100 thus manufactured are similar to the steps described in the first embodiment.

That is, also in the manufacturing method of the present embodiment, a bonding step S5 and a process step S6 similar to those of the first embodiment are further performed to manufacture a glass panel unit 1 as illustrated in FIG. 6. The bonding step S5, the process step S6, and a second bonding step S7 similar to those of the first embodiment are further performed to manufacture a glass panel unit 1 having a three-layer structure as illustrated in FIGS. 9 and 10. The bonding step S5, the process step S6, and a fitting step S8 similar to those of the first embodiment are further performed to manufacture a glass window 6 as illustrated in FIG. 12.

In the pillar mounting device of the present embodiment, the punch 4 includes one suction pin 43, but the punch 4 may include a plurality of suction pins 43. In this case, similar to the plurality of pins 42 included in the pillar mounting device of the second embodiment, the plurality of suction pins 43 included in the punch 4 punch a plurality of portions 31 from the base material 30 of the sheet 3, thereby forming a plurality of pillars 14. The plurality of suction pins 43 may be driven altogether or individually.

The plurality of pillars 14 thus formed are mounted on the surface 110 of the first substrate 11 with the plurality of pillars 14 being in vacuum contact with the plurality of suction pins 43. In this case, the plurality of suction pins 43 function as movement mechanisms 7 configured to move the plurality of pillars 14 thus formed to the surface 110 of the first substrate 11.

A timing at which the suction pin 43 starts sucking air through the inlet 431 may be a timing at which the suction pin 43 punches a portion 31 from the base material 30, or before or after this timing.

Fourth Embodiment

Figure 20:
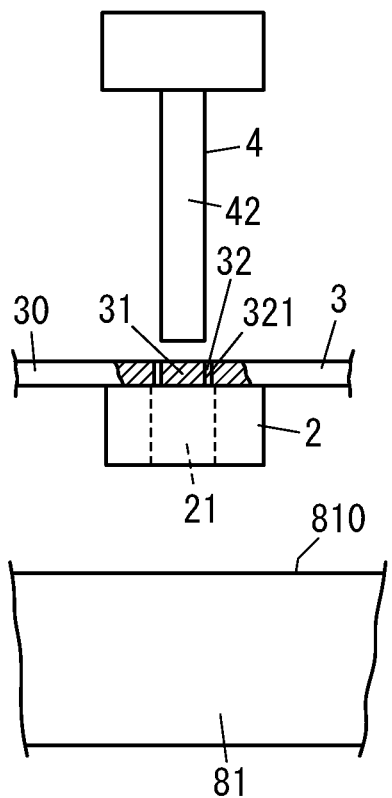
FIG. 20 is a partially cutaway side view schematically illustrating a pillar mounting device of a fourth embodiment.
Figure 21:
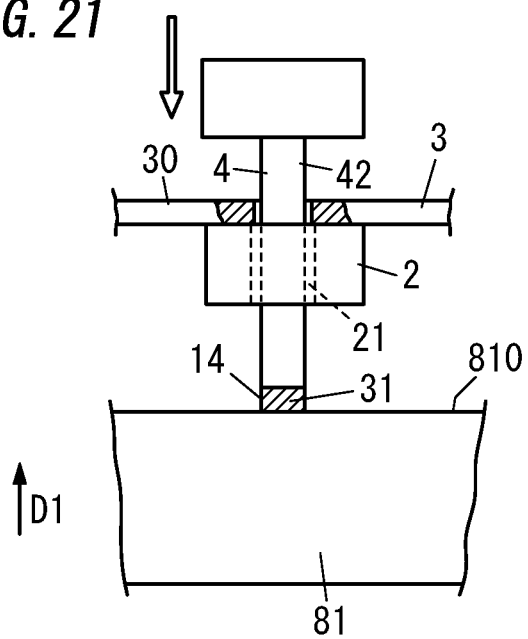
FIG. 21 is a partially cutaway side view schematically illustrating how the pillar mounting device of the fourth embodiment punches a sheet.
Figure 22:
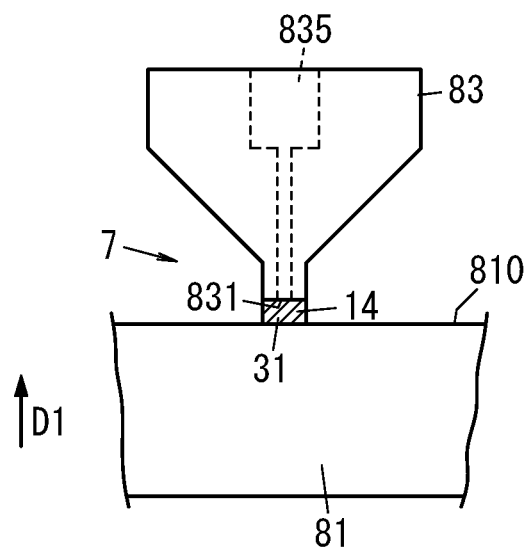
FIG. 22 is a partially cutaway side view schematically illustrating how a pillar formed by the pillar mounting device of the fourth embodiment is moved.

A pillar mounting device of a fourth embodiment will be descried based on FIGS. 20 to 22. Of components of the pillar mounting device of the present embodiment, components similar to those of the first embodiment are denoted by the same reference signs, and the detailed description thereof will be omitted. In the following description, of the components of the pillar mounting device of the present embodiment, components different from those of the first embodiment will be mainly described.

The pillar mounting device of the present embodiment includes a table 81 having a surface 810 which is flat and which faces upward, a support table 2 installed above the table 81, a sheet 3 supported in a horizontal position by the support table 2, and a punch 4 installed above the sheet 3. The configurations of the support table 2, the sheet 3, and the punch 4 are similar to those in the first embodiment.

Next, a manufacturing method of a pillar mounting substrate 100 by using the pillar mounting device of the present embodiment will be described. In the following description, detailed description of components in each step which are similar to those in the first embodiment is partially omitted.

Disposition Step

In the disposition step S1, the table 81, the support table 2, the sheet 3, and the punch 4 are disposed (see FIG. 20) such that the support table 2 is located above the table 81, the support table 2 supports the sheet 3, and the punch 4 is located above the sheet 3.

Punching Step

In the punching step S2, a pin 42 included in the punch 4 is driven downward through a through hole 21 in the support table 2. The pin 42 downward punches a portion 31 surrounded by a loop-shaped groove 32 from a base material 30 of the sheet 3 through the through hole 21 (see the void arrow in FIG. 21).

The portion 31 punched by the pin 42 forms a pillar 14. The pillar 14 is placed on the surface 810 of the table 81 with the pillar 14 being pressed against a tip surface of the pin 42.

Pillar Mounting Step

In the pillar mounting step S3, after the punch 4 is separated from the pillar 14, a suction tool 83 (see FIG. 22) different from the punch 4 comes into vacuum contact with the pillar 14 placed on the table 81. The suction tool 83 has an end surface in which an inlet 831 is formed. The inlet 831 is in communication with a space 835 formed in the suction tool 83. Reducing a pressure in the space 835 with, for example, a vacuum pump enables the inlet 831 of the suction tool 83 to be in vacuum contact with the pillar 14.

The suction tool 83 moves the pillar 14 to a prescribed location on a surface 110 of a first substrate 11 (see, for example, FIG. 5) with the vacuum contact of the inlet 831 with the pillar 14 being maintained. That is, in the manufacturing method of the present embodiment, the suction tool 83 functions as a movement mechanism 7 configured to move the pillar 14 to the surface 110 of the first substrate 11.

Displacement Step

Although not shown, in the displacement step S4, the sheet 3 and the table 81 are displaced in the horizontal direction relative to the support table 2. After the displacement step S4 is performed, a next punching step S2 and a next pillar mounting step S3 are performed.

In the next punching step S2, of a large number of portions 31 included in the sheet 3, a portion 31 which has not been punched and remains is punched with the pin 42. The portion 31 thus punched forms another pillar 14. In the next pillar mounting step S3, the pillar 14 is mounted on the surface 110 of the first substrate 11 by the suction tool 83.

The punching step S2 and the pillar mounting step S3 following the punching step S2 are repeated a plurality of times with the displacement step S4 performed between sets each including the punching step S2 and the pillar mounting step S3 which are repeated. Thus, the pillar mounting substrate 100 (see FIG. 5) including a plurality of pillars 14 is efficiently manufactured.

Steps of manufacturing a glass panel unit 1 and a glass window 6 each including the pillar mounting substrate 100 thus manufactured are similar to the steps described in the first embodiment.

That is, also in the manufacturing method of the present embodiment, a bonding step S5 and a process step S6 similar to those of the first embodiment are further performed to manufacture a glass panel unit 1 as illustrated in FIG. 6. The bonding step S5, the process step S6, and a second bonding step S7 similar to those of the first embodiment are further performed to manufacture a glass panel unit 1 having a three-layer structure as illustrated in FIGS. 9 and 10. The bonding step S5, the process step S6, and a fitting step S8 similar to those of the first embodiment are further performed to manufacture a glass window 6 as illustrated in FIG. 12.

In the pillar mounting device of the present embodiment, the punch 4 includes one pin 42, but the punch 4 may include a plurality of pins 42. In this case, similar to the pillar mounting device of the second embodiment, the plurality of pins 42 included in the punch 4 punch a plurality of portions 31 from the base material 30 of the sheet 3, thereby forming a plurality of pillars 14. The plurality of pins 42 may be driven altogether or individually.

The plurality of pillars 14 thus formed are mounted on the surface 110 of the first substrate 11 with the pillars 14 being in vacuum contact with the plurality of suction tools 83. That is, the plurality of suction tools 83 function as movement mechanisms 7 configured to move the plurality of pillars 14 thus formed to the surface 110 of the first substrate 11.

Fifth Embodiment

Figure 23:
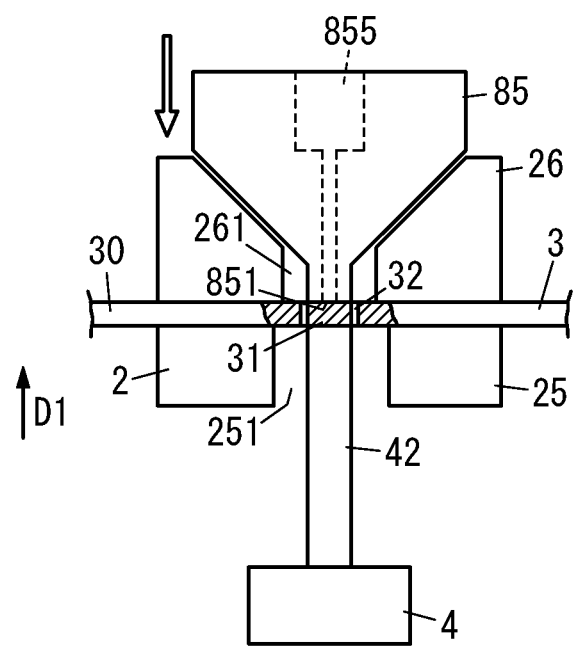
FIG. 23 is a partially cutaway side view schematically illustrating a pillar mounting device of a fifth embodiment.
Figure 24:
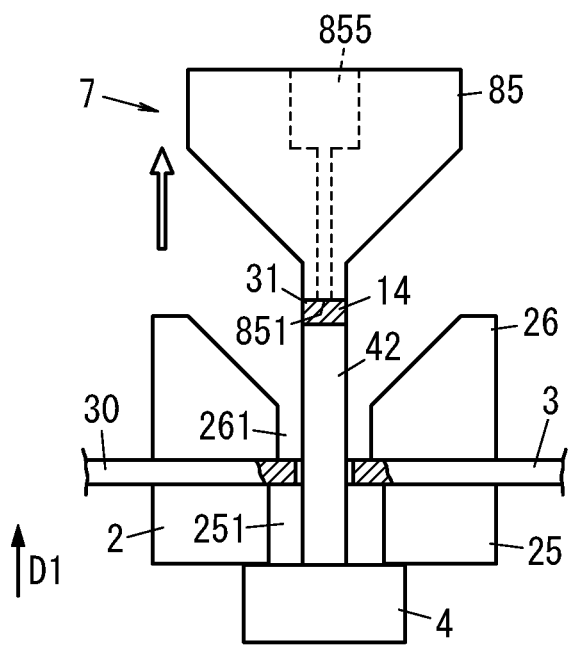
FIG. 24 is a partially cutaway side view schematically illustrating how the pillar mounting device of the fifth embodiment punches a sheet.
Figure 25:
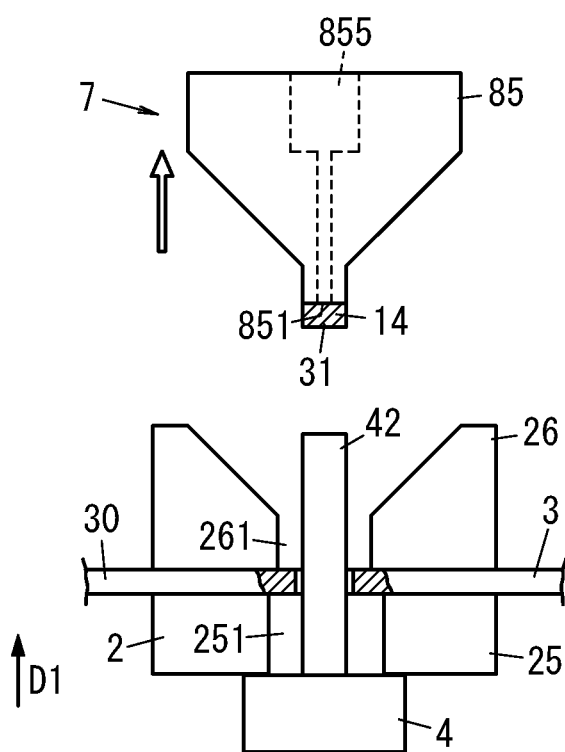
FIG. 25 is a partially cutaway side view schematically illustrating how a pillar formed by the pillar mounting device of the fifth embodiment is moved.

A pillar mounting device of a fifth embodiment will be descried based on FIGS. 23 to 25. Of components of the pillar mounting device of the present embodiment, components similar to those of the first embodiment are denoted by the same reference signs, and the detailed description thereof will be omitted. In the following description, of the components of the pillar mounting device of the present embodiment, components different from those of the first embodiment will be mainly described.

The pillar mounting device of the present embodiment includes a support table 2, a sheet 3 held in a horizontal position by the support table 2, a punch 4 installed below the sheet 3, and a suction tool 85 installed above the sheet 3.

The support table 2 includes a lower member 25 and an upper member 26. The lower member 25 has a through hole 251 vertically penetrating therethrough. The upper member 26 has a through hole 261 vertically penetrating therethrough. Between the lower member 25 and the upper member 26, a small gap is provided, and the sheet 3 is disposed in the gap.

Similarly to the first embodiment, the sheet 3 has a base material 30 in which a plurality of (a large number of) loop-shaped grooves 32 are formed in a matrix form (see FIG. 2A).

The punch 4 has a pin 42 protruding upward. The pin 42 is configured such that a tip surface (upper surface) of the pin 42 punches a portion 31 upward from the base material 30 of the sheet 3. The portion 31 is surrounded by the loop-shaped groove 32. The sheet 3 is supported by the support table 2. The suction tool 85 is located above the tip surface of the pin 42 with the sheet 3 placed between the tip surface and the suction tool 85.

The suction tool 85 has an end surface (lower surface) in which an inlet 851 is formed. The inlet 851 is in communication with a space 855 formed in the suction tool 85. Reducing a pressure in the space 855 with, for example, a vacuum pump enables the inlet 851 of the suction tool 85 to be in vacuum contact with the pillar 14.

Next, a manufacturing method of a pillar mounting substrate 100 by using the pillar mounting device of the present embodiment will be described. In the following description, detailed description of components in each step which are similar to those in the first embodiment is partially omitted.

Disposition Step

In the disposition step S1, the support table 2, the sheet 3, the punch 4, and the suction tool 85 are disposed such that the support table 2 supports the sheet 3, the punch 4 is located below the sheet 3, and the suction tool 85 is located above the sheet 3 (see FIG. 23). The pin 42 of the punch 4 and the inlet 851 of the suction tool 85 are located on respective sides of the sheet 3 (portion 31).

Punching Step

In the punching step S2, the pin 42 included in the punch 4 is driven upward through the through hole 251 in the lower member 25. The pin 42 upward punches a portion 31 surrounded by the loop-shaped groove 32 from the base material 30 of the sheet 3 through hole 261 of the upper member 26 (see the void arrow in FIG. 24).

The portion 31 upward punched by the pin 42 and having a columnar shape forms the pillar 14. The pillar 14 is pressed against the inlet 851 of the suction tool 85 with the pillar 14 being pressed against the tip surface of the pin 42.

In the pillar mounting device of the present embodiment, the inlet 851 of the suction tool 85 abuts on the portion 31 of the sheet 3 before the pin 42 is driven upward. The pillar mounting device of the present embodiment is configured to pushes up both the portion 31 (pillar 14) and the suction tool 85 when the pin 42 punches the portion 31 from the base material 30.

Note that before the pin 42 is driven, the suction tool 85 may be out of contact with the sheet 3. In this case, after the pin 42 punches the portion 31 from the base material 30, the suction tool 85 abuts on and sucks up the portion 31 (pillar 14).

Pillar Mounting Step

As illustrated in FIG. 25, in the pillar mounting step S3, while the suction tool 85 is in vacuum contact with the pillar 14 which abuts on the inlet 851, the suction tool 85 moves the pillar 14 to a prescribed location on a surface 110 of a first substrate 11 (see, for example, FIG. 5). That is, in the manufacturing method of the present embodiment, the suction tool 85 function as a movement mechanism 7 configured to move the pillar 14 thus formed to the surface 110 of the first substrate 11.

A timing at which the suction tool 85 starts sucking air through the inlet 851 may be a timing at which the pin 42 punches the portion 31 from the base material 30, or before or after this timing.

Displacement Step

Although not shown, in the displacement step S4, after the punching step S2 and the pillar mounting step S3 are performed, the sheet 3 is displaced in the horizontal direction relative to the support table 2, the punch 4, and the suction tool 85. After the displacement step S4 is performed, a next punching step S2 and a next pillar mounting step S3 are performed.

In the next punching step S2, of a large number of portions 31 included in the sheet 3, a portion 31 which has not been punched and remains is punched with the pin 42. The portion 31 thus punched forms another pillar 14. In the next pillar mounting step S3, the pillar 14 is mounted on the surface 110 of the first substrate 11 by the suction tool 85.

Similar to the first embodiment, in the manufacturing method of the present embodiment, the punching step S2 and the pillar mounting step S3 following the punching step S2 are repeated a plurality of times with the displacement step S4 performed between sets each of which including the punching step S2 and the pillar mounting step S3 which are repeated. Thus, the pillar mounting substrate 100 (see FIG. 5) including a plurality of pillars 14 is efficiently manufactured.

Steps of manufacturing a glass panel unit 1 and a glass window 6 each including the pillar mounting substrate 100 thus manufactured are similar to the steps described in the first embodiment.

That is, also in the manufacturing method of the present embodiment, a bonding step S5 and a process step S6 similar to those of the first embodiment are further performed to manufacture a glass panel unit 1 as illustrated in FIG. 6. The bonding step S5, the process step S6, and a second bonding step S7 similar to those of the first embodiment are further performed to manufacture a glass panel unit 1 having a three-layer structure as illustrated in FIGS. 9 and 10. The bonding step S5, the process step S6, and a fitting step S8 similar to those of the first embodiment are further performed to manufacture a glass window 6 as illustrated in FIG. 12.

In the pillar mounting device of the present embodiment, the punch 4 includes one pin 42 and one suction tool 85 is provided, but the punch 4 may include a plurality of pins 42, and a plurality of suction tools 85 may be provided. In this case, similar to the pillar mounting device of the second embodiment, the plurality of pins 42 included in the punch 4 punch a plurality of portions 31 from the base material 30 of the sheet 3, thereby forming a plurality of pillars 14. The plurality of pins 42 may be driven altogether or individually.

The plurality of pillars 14 thus formed are transported to the surface 110 of the first substrate 11 and mounted on the surface 110 with the pillars 14 being in vacuum contact with the plurality of suction tools 85. In this case, the plurality of suction tools 85 function as movement mechanisms 7 configured to move the plurality of pillars 14 to the surface 110 of the first substrate 11.

The pillar mounting device, the glass panel unit manufacturing method, and the glass window manufacturing method of each embodiment have been described above. However, design modification may be accordingly made to each embodiment, and the configurations of the embodiments may also be accordingly combined with each other.

Effects

As can be seen from each embodiment described above, a sheet 3 of a first aspect, for forming pillars for a glass panel unit, includes a base material 30 having a sheet-like shape. The base material 30 has a plurality of loop-shaped grooves 32. The base material 30 has a plurality of portions 31 serving as the pillars 14, each of the plurality of portions 31 being surrounded by a corresponding one of the plurality of loop-shaped grooves 32.

With the sheet 3 of the first aspect, for forming the pillar for the glass panel unit, the plurality of portions 31 included in the base material 30 of the sheet 3 are punched while a glass panel unit 1 is manufactured, thereby obtaining the plurality of pillars 14. Thus, the step of once storing a large number of pillars 14 is not required, and therefore, it is possible to reduce pillars 14 adsorbed on each other. In addition, since each portion 31 of the base material 30 is surrounded by the loop-shaped groove 32, formation of burrs at each portion 31 (pillar 14) thus punched is reduced. Since formation of burrs reduces the compressive strength of the pillar 14, the pillar 14 with reduced burrs provides a high compressive strength.

In a sheet 3 of a second aspect referring to the first aspect, for forming pillars for a glass panel unit, the base material 30 is made of a resin.

With the sheet 3 of the second aspect, for forming the pillar for the glass panel unit, the plurality of portions 31 included in the base material 30 are punched while a glass panel unit 1 is manufactured, thereby obtaining the plurality of pillars 14 made of a resin. The plurality of pillars 14 made of a resin generally has a property of being easily adsorbed on each other due to static electricity, but the step of once storing these pillars 14 is not required, and therefore, adsorption of the plurality of pillars 14 made of a resin on each other is reduced. In addition, since each portion 31 of the base material 30 is surrounded by the loop-shaped groove 32, formation of burrs at the portion 31 (pillar 14 made of a resin) is reduced.

In a sheet 3 of a third aspect referring to the first aspect, for forming pillars for a glass panel unit, the base material 30 includes a plurality of resin layers.

With the sheet 3 of the third aspect, for forming the pillar for the glass panel unit, the plurality of portions 31 included in the base material 30 are punched while a glass panel unit 1 is manufactured, thereby obtaining the plurality of pillars 14 made of a resin. The plurality of pillars 14 made of a resin generally has a property of being easily adsorbed on each other due to static electricity, but the step of once storing these pillars 14 is not required, and therefore, adsorption of the plurality of pillars 14 on each other is reduced. In addition, since each portion 31 of the base material 30 is surrounded by the loop-shaped groove 32, it is possible to reduce formation of burrs at each portion 31 (pillar 14 including a plurality of resin layers) punched out.

In a sheet 3 of a fourth aspect referring to any one of the first to third aspects, for forming pillars for a glass panel unit, at least one of the plurality of loop-shaped grooves 32 has a discontinuous loop shape. With the sheet 3 of the fourth aspect, for forming the pillar for the glass panel unit, it is possible to effectively reduce formation of burrs at the portion 31 (pillar 14) punched from the base material 30.

In a sheet 3 of a fifth aspect referring to any one of the first to third aspects, for forming pillars for a glass panel unit, at least one of the plurality of loop-shaped grooves 32 has a discontinuous loop shape and penetrates through the base material 30. With the sheet 3 of the fifth aspect, for forming the pillar for the glass panel unit, it is possible to effectively reduce formation of burrs at the portion 31 (pillar 14) punched from the base material 30.

In a sheet 3 of a sixth aspect referring to any one of the first to third aspects, for forming pillars for a glass panel unit, at least one of the plurality of loop-shaped grooves 32 has a continuous loop shape, and at least a part of the continuous loop shape does not penetrate through the base material 30. With the sheet 3 of the sixth aspect, for forming the pillar for the glass panel unit, it is possible to effectively reduce formation of burrs at the portion 31 (pillar 14) punched from the base material 30.

In a sheet 3 of a seventh aspect referring to any one of the first to sixth aspects, for forming pillars for a glass panel unit, each of the plurality of loop-shaped grooves 32 is a laser-processed loop-shaped groove. With the sheet 3 of the seventh aspect, for forming the pillar for the glass panel unit, it is possible to effectively reduce formation of burrs at the portion 31 (pillar 14) punched from the base material 30.

A pillar mounting device of a first aspect, for manufacturing a glass panel unit, includes the sheet 3 of any one of the first to seventh aspects, for forming the pillar for the glass panel unit, a punch 4 configured to punch at least one of the plurality of portions 31 from the base material 30 of the sheet 3 to form at least one pillar 14, and a movement mechanism 7 configured to move the at least one pillar 14 to a surface 110 of a substrate 11 including a glass pane.

With the pillar mounting device of the first aspect, for manufacturing the glass panel unit, it is possible to punch, at a timing immediately before the pillar 14 is mounted, the portion 31 from the base material 30 of the sheet 3 to obtain the pillar 14. Thus, a step of once storing and transporting a large number of pillars 14 is not required. Thus, it is possible to reduce pillars 14 adsorbed on each other. In addition, since each portion 31 of the base material 30 is surrounded by the loop-shaped groove 32, formation of burrs at each portion 31 (pillar 14) thus punched is reduced. The pillar 14 with reduced burrs provides a high compressive strength.

In a pillar mounting device of a second aspect referring to the first aspect, for manufacturing a glass panel unit, the movement mechanism 7 includes at least one pin 42 included in the punch 4. The at least one pin 42 is configured to punch the at least one of the plurality of portions 31 from the base material 30 to form the at least one pillar 14, and then move the at least one pillar 14 to the surface 110 of the substrate 11.

The pillar mounting device of the second aspect, for manufacturing the glass panel unit, enables both forming the pillar 14 and mounting the pillar 14 thus formed on the substrate 11 to be performed by the pin 42.

In a pillar mounting device of a third aspect referring to the first aspect, for manufacturing a glass panel unit, the movement mechanism 7 includes at least one suction pin 43 included in the punch 4. The at least one suction pin 43 is configured to punch the at least one of the plurality of portions 31 from the base material 30 to form the at least one pillar 14, and then move the at least one pillar 14 to the surface 110 of the substrate 11 with the at least one pillar 14 being sucked up by the at least one suction pin 43.

The pillar mounting device of the third aspect, for manufacturing the glass panel unit, enables both forming the pillar 14 and mounting the pillar 14 thus formed on the substrate 11 to be performed by the suction pin 43.

In a pillar mounting device of a fourth aspect referring to the first aspect, for manufacturing a glass panel unit, the movement mechanism 7 includes a suction tool 83 configured to suck up the at least one pillar 14.

The pillar mounting device of the fourth aspect, for manufacturing the glass panel unit, enables the pillar 14 formed by punching to be promptly mounted on the substrate 11 by using the suction tool 83.

In a pillar mounting device of a fifth aspect referring to the first aspect, for manufacturing a glass panel unit, the punch 4 includes at least one pin 42, and the movement mechanism 7 includes a suction tool 85 configured to suck up the at least one pillar 14. The at least one pin 42 is configured to punch the at least one of the plurality of portions 31 from the base material 30 to form the at least one pillar 14, and then press the at least one pillar 14 against the suction tool 85.

The pillar mounting device of the fifth aspect, for manufacturing the glass panel unit, enables the pillar 14 thus formed by punching to be promptly mounted on the substrate 11 by using the suction tool 85.

A glass panel unit manufacturing method of a first aspect includes a punching step S2, a pillar mounting step S3, and a bonding step S5. In the punching step S2, a sheet 3 and a punch 4 are adopted. The sheet 3 includes a base material 30 having a plurality of loop-shaped grooves 32. The punch 4 punches at least one of a plurality of portions 31 from the base material 30 to form at least one pillar 14. Each of the plurality of portions 31 is surrounded by a corresponding one of the plurality of loop-shaped grooves 32 of the base material 30. In the pillar mounting step S3, the at least one pillar 14 is mounted on a surface 110 of a first substrate 11 including a glass pane. In the bonding step S5, the first substrate 11 and the second substrate 12 including a glass pane are bonded together with a sealing member 13 to form an inside space 15 between the first substrate 11 and the second substrate 12 so that the at least one pillar 14 is located in the inside space 15.

According to the glass panel unit manufacturing method of the first aspect, it is possible to punch, at a timing immediately before the pillar 14 is mounted on a first substrate 11, the portion 31 from the base material 30 of the sheet 3 to obtain the pillar 14. Thus, a step of once storing and transporting a large number of pillars 14 is not required. It is possible to reduce pillars 14 adsorbed on each other. In addition, since each portion 31 of the base material 30 is surrounded by the loop-shaped groove 32, formation of burrs at each portion 31 (pillar 14) thus punched is reduced. The pillar 14 with reduced burrs provides a high compressive strength.

In a glass panel unit manufacturing method of a second aspect referring to the first aspect, the base material 30 is made of a resin.

According to the glass panel unit manufacturing method of the second aspect, it is possible to punch, at a timing immediately before the pillar 14 is mounted on the first substrate 11, the portion 31 from the base material 30 to obtain the plurality of pillar 14 made of a resin. The pillars 14 made of a resin are generally easily adsorbed on each other due to static electricity, but since the step of once storing a plurality of these pillars 14 is not required, adsorption of the pillars 14 on each other is reduced. In addition, since each portion 31 of the base material 30 is surrounded by the loop-shaped groove 32, formation of burrs at the portion 31 (pillar 14 made of a resin) is reduced.

In a glass panel unit manufacturing method of a third aspect referring to the first or second aspect, in the pillar mounting step S3, the punch 4 mounts the at least one pillar 14 on the surface 110 of the first substrate 11.

The glass panel unit manufacturing method of the third aspect enables both forming the pillar 14 and mounting the pillar 14 thus formed on the substrate 11 to be performed by the punch 4.

In a glass panel unit manufacturing method of a fourth aspect referring to the third aspect, in the punching step S2 and the pillar mounting step S3, the sheet 3 is located between the punch 4 and the first substrate 11.

According to the glass panel unit manufacturing method of the fourth aspect, it is possible to mount the pillar 14 on the first substrate 11 by the punch 4 immediately after the pillar 14 is formed by punching.

In a glass panel unit manufacturing method of a fifth aspect referring to the first or second aspect, the punch 4 includes at least one suction pin 43. In the punching step S2, the at least one suction pin 43 punches at least one of the plurality of portions 31 from the base material 30 to form the at least one pillar 14. In the pillar mounting step S3, the at least one suction pin 43 mounts the at least one pillar 14 on the surface 110 of the first substrate 11 while sucking up the at least one pillar 14.

The glass panel unit manufacturing method of the fifth aspect enables both forming the pillar 14 and mounting the pillar 14 thus formed on the substrate 11 to be performed by the suction pin 43.

In a glass panel unit manufacturing method of a sixth aspect referring to the first or second aspect, the punch 4 includes at least one pin 42. In the punching step S2, the at least one pin 42 punches at least one of the plurality of portions 31 from the base material 30 to form the at least one pillar 14. In the pillar mounting step S3, a suction tool 83 different from the punch 4 mounts the at least one pillar 14 on the surface 110 of the first substrate 11 while sucking up the at least one pillar 14.

The glass panel unit manufacturing method of the sixth aspect enables the pillar 14 thus formed by punching to be promptly mounted on the first substrate 11 by the suction tool 83.

In a glass panel unit manufacturing method of a seventh aspect referring to the first or second aspect, the punch 4 includes at least one pin 42. In the punching step S2, the at least one pin 42 punches at least one of the plurality of portions 31 from the base material 30 to form the at least one pillar 14 and the at least one pin 42 presses the at least one pillar 14 against a suction tool 85. In the pillar mounting step S3, the suction tool 85 mounts the at least one pillar 14 on the surface 110 of the first substrate 11 while sucking up the at least one pillar 14.

The glass panel unit manufacturing method of the seventh aspect enables the pillar 14 thus formed by punching to be promptly mounted on the first substrate 11 by the suction tool 85.

In a glass panel unit manufacturing method of an eighth aspect referring to any one of the first to seventh aspects, the punching step S2 and the pillar mounting step S3 are repeated a plurality of times, and then, the bonding step S5 is performed.

The glass panel unit manufacturing method of the eighth aspect enables efficient manufacturing of a glass panel unit 1 including a plurality of pillars 14 sandwiched between the first substrate 11 and the second substrate 12.

A glass panel unit manufacturing method of a ninth aspect referring to any one of the first to eighth aspects further includes a second bonding step S7 of bonding a third substrate 17 to one of the first substrate 11 and the second substrate 12 with a frame member 181 disposed between the third substrate 17 and the one of the first substrate 11 and the second substrate 12. The third substrate 17 includes a glass pane.

The glass panel unit manufacturing method of the ninth aspect enables manufacturing of a glass panel unit 1 having a further improved thermal insulation properties.

A glass window manufacturing method of a first aspect includes a fitting step S8 of fitting a window frame 19 to the glass panel unit 1 manufactured by the glass panel manufacturing method of any one of the first to ninth aspects.

The glass window manufacturing method of the first aspect enables efficient manufacturing of a glass window having a high thermal insulation property.

The invention claimed is:

1. A glass panel unit manufacturing method, comprising:
   a punching step of preparing a punch and a sheet including a base material having a plurality of loop-shaped grooves, and punching at least one of a plurality of portions of the base material from the base material by the punch to form at least one pillar, each of the plurality of portions being surrounded by a corresponding one of the plurality of loop-shaped grooves;
   a pillar mounting step of mounting the at least one pillar on a surface of a first substrate including a glass pane; and
   a bonding step of bonding the first substrate and a second substrate including a glass pane together with a sealing member to form an inside space between the first substrate and the second substrate so that the at least one pillar is located in the inside space.

2. The glass panel unit manufacturing method of claim 1, wherein
   the base material is made of a resin.

3. The glass panel unit manufacturing method of claim 1, wherein
   in the pillar mounting step, the punch mounts the at least one pillar on the surface of the first substrate.

4. The glass panel unit manufacturing method of claim 3, wherein
   in the punching step and the pillar mounting step, the sheet is located between the punch and the first substrate.

5. The glass panel unit manufacturing method of claim 1, wherein
   the punch includes at least one suction pin,
   in the punching step, the at least one suction pin punches at least one of the plurality of portions from the base material to form the at least one pillar, and
   in the pillar mounting step, the at least one suction pin mounts the at least one pillar on the surface of the first substrate while sucking up the at least one pillar.

6. The glass panel unit manufacturing method of claim 1, wherein
   the punch includes at least one pin,
   in the punching step, the at least one pin punches at least one of the plurality of portions from the base material to form the at least one pillar, and
   in the pillar mounting step, a suction tool different from the punch mounts the at least one pillar on the surface of the first substrate while sucking up the at least one pillar.

7. The glass panel unit manufacturing method of claim 1, wherein
   the punch includes at least one pin,
   in the punching step, the at least one pin punches at least one of the plurality of portions from the base material to form the at least one pillar, and
   the at least one pin presses the at least one pillar against a suction tool, and
   in the pillar mounting step, the suction tool mounts the at least one pillar on the surface of the first substrate while sucking up the at least one pillar.

8. The glass panel unit manufacturing method of claim 1, wherein
   the punching step and the pillar mounting step are repeated a plurality of times, and then, the bonding step is performed.

9. The glass panel unit manufacturing method of claim 1 further comprising a second bonding step of bonding a third substrate to one of the first substrate and the second substrate with a frame member disposed between the third substrate and the one of the first substrate and the second substrate, the third substrate including a glass pane.

10. A glass window manufacturing method comprising a fitting step of fitting a window frame to the glass panel unit manufactured by the glass panel manufacturing method of claim 1.

* * * * *